United States Patent
Ryoo et al.

(10) Patent No.: US 10,638,331 B2
(45) Date of Patent: Apr. 28, 2020

(54) CHANNEL ACCESSING METHOD AND DEVICE IN WIRELESS COMMUNICATION SYSTEM

(71) Applicant: Samsung Electronics Co., Ltd., Suwon-si (KR)

(72) Inventors: Sunheui Ryoo, Yongin-si (KR); Jungsoo Jung, Seongnam-si (KR); Jungmin Moon, Suwon-si (KR); Anshuman Nigam, Bangalore (IN); Sungjin Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 15/511,209

(22) PCT Filed: Sep. 15, 2015

(86) PCT No.: PCT/KR2015/009678
§ 371 (c)(1),
(2) Date: Mar. 14, 2017

(87) PCT Pub. No.: WO2016/043502
PCT Pub. Date: Mar. 24, 2016

(65) Prior Publication Data
US 2017/0257780 A1  Sep. 7, 2017

(30) Foreign Application Priority Data

Sep. 15, 2014  (KR) .................. 10-2014-0122187

(51) Int. Cl.
*H04W 76/20* (2018.01)
*H04W 16/28* (2009.01)
(Continued)

(52) U.S. Cl.
CPC .......... *H04W 16/28* (2013.01); *H04B 7/0617* (2013.01); *H04B 7/0695* (2013.01);
(Continued)

(58) Field of Classification Search
CPC ............................. H04W 16/28; H04W 72/04
See application file for complete search history.

(56) References Cited

U.S. PATENT DOCUMENTS 8,619,654 B2  12/2013  Yang et al.
8,942,207 B2  1/2015  Son et al.
(Continued)

FOREIGN PATENT DOCUMENTS

CN  103119989 A  5/2013
CN  103202067 A  7/2013
(Continued)

OTHER PUBLICATIONS

NTT Docomo, Inc., "Introduction of Dual Connectivity," R2-143417, 3GPP TSG-RAN WG2 Meeting #87, Dresden, Germany, Aug. 8, 2014, 65 pages.
(Continued)

*Primary Examiner* — Brandon M Renner

(57) ABSTRACT

The present invention relates to a channel accessing method and device in a wireless communication system and, particularly, to a channel accessing method and device for a call handover for a terminal in a wireless communication system using a plurality of beams. The method according to an embodiment of the present invention, as a method of controlling a macro cell base station when a terminal that is communicating with the macro cell base station performs channel access with a small cell base station in a wireless network capable of using a plurality of transmitting/receiving beams, may include the steps of: determining whether to request a channel setting for a call for the terminal to the (Continued)

small cell base station when a signal strength measurement report for a channel synchronized with the small cell base station is received from the terminal; providing information including at least one of recommending information on the transmitting/receiving beams of the terminal and position information on the terminal in a request message to the small cell base station when a channel setting request to the small cell base station is decided upon; stopping the transmission of data to the terminal and a set data radio bearer (DRB2) when a response message for accepting the channel setting for the terminal is received from the small cell base station; transmitting a radio resource control access reconfiguration message to the terminal to communicate with the small cell base station; and providing information on data to be transmitted and received by the terminal to the small cell base station.

10 Claims, 15 Drawing Sheets

(51) Int. Cl.
   *H04W 24/10* (2009.01)
   *H04B 7/06* (2006.01)
   *H04W 36/00* (2009.01)
   *H04W 36/28* (2009.01)
   *H04B 7/08* (2006.01)
   *H04W 74/08* (2009.01)
   *H04W 36/04* (2009.01)
   *H04W 16/32* (2009.01)
   *H04W 72/04* (2009.01)

(52) U.S. Cl.
   CPC ............ *H04B 7/088* (2013.01); *H04W 24/10* (2013.01); *H04W 36/0016* (2013.01); *H04W 36/0072* (2013.01); *H04W 36/28* (2013.01); *H04W 74/0833* (2013.01); *H04W 16/32* (2013.01); *H04W 36/0069* (2018.08); *H04W 36/04* (2013.01); *H04W 72/046* (2013.01)

(56) References Cited

U.S. PATENT DOCUMENTS

| | | | |
|---|---|---|---|
| 9,258,750 B2 | 2/2016 | Li et al. | |
| 9,351,193 B2* | 5/2016 | Raleigh | ................ H04L 41/145 |
| 9,455,807 B2 | 9/2016 | Jeong et al. | |
| 9,603,073 B2 | 3/2017 | Jung et al. | |
| 10,231,156 B2 | 3/2019 | Wu et al. | |
| 2005/0070285 A1* | 3/2005 | Goransson | ............ H04W 36/30 |
| | | | 455/436 |
| 2011/0212695 A1* | 9/2011 | Wild | ........................ H01Q 3/26 |
| | | | 455/73 |
| 2013/0064191 A1 | 3/2013 | Jeong et al. | |
| 2013/0083774 A1 | 4/2013 | Son et al. | |
| 2013/0190011 A1* | 7/2013 | Kim | ...................... H04W 64/00 |
| | | | 455/456.1 |
| 2014/0128115 A1* | 5/2014 | Siomina | ................ H04L 1/0015 |
| | | | 455/501 |
| 2014/0153423 A1* | 6/2014 | Shin | ....................... H04W 36/18 |
| | | | 370/252 |
| 2014/0192775 A1 | 7/2014 | Li et al. | |
| 2014/0206322 A1* | 7/2014 | Dimou | .................. H04W 4/005 |
| | | | 455/414.1 |
| 2014/0295842 A1* | 10/2014 | Choi | ..................... H04B 7/0408 |
| | | | 455/436 |
| 2016/0192323 A1* | 6/2016 | Kim | ....................... H04W 68/02 |
| | | | 455/458 |
| 2016/0204921 A1* | 7/2016 | Kim | ....................... H04L 12/189 |
| | | | 370/312 |
| 2017/0041841 A1* | 2/2017 | Pedersen | ........... H04W 56/0045 |

FOREIGN PATENT DOCUMENTS

| | | |
|---|---|---|
| CN | 103888987 A | 6/2014 |
| KR | 2011-0082462 A | 7/2011 |
| KR | 2013-0034827 A | 4/2013 |
| WO | 2014-109606 A1 | 7/2014 |

OTHER PUBLICATIONS

CATT, "Discussion on SCG random access," R2-143549, 3GPP TSG-RAN WG2 Meeting #87, Dresden, Germany, Aug. 8, 2014, 7 pages.
LG Electronics Inc., "Further consideration on RA in SCG," R2-143715, 3GPP TSG-RAN WG2 Meeting #87, Dresden, Germany, Aug. 9, 2014, 4 pages.
Ericsson, "Inter node RRC messages for dual connectivity", 3GPP TSG-RAN WG2 #87, Aug. 18-22, 2014, Tdoc R2-143501, 5 pages.
Alcatel-Lucent et al., "DRB addition and release for Dual connectivity 1A", 3GPP TSG-RAN WG2#87, Aug. 18-22, 2014, R2-143630, 4 pages.
Office Action dated Sep. 3, 2019 in connection with Chinese Patent Application No. 201580060256.4, 16 pages.

* cited by examiner

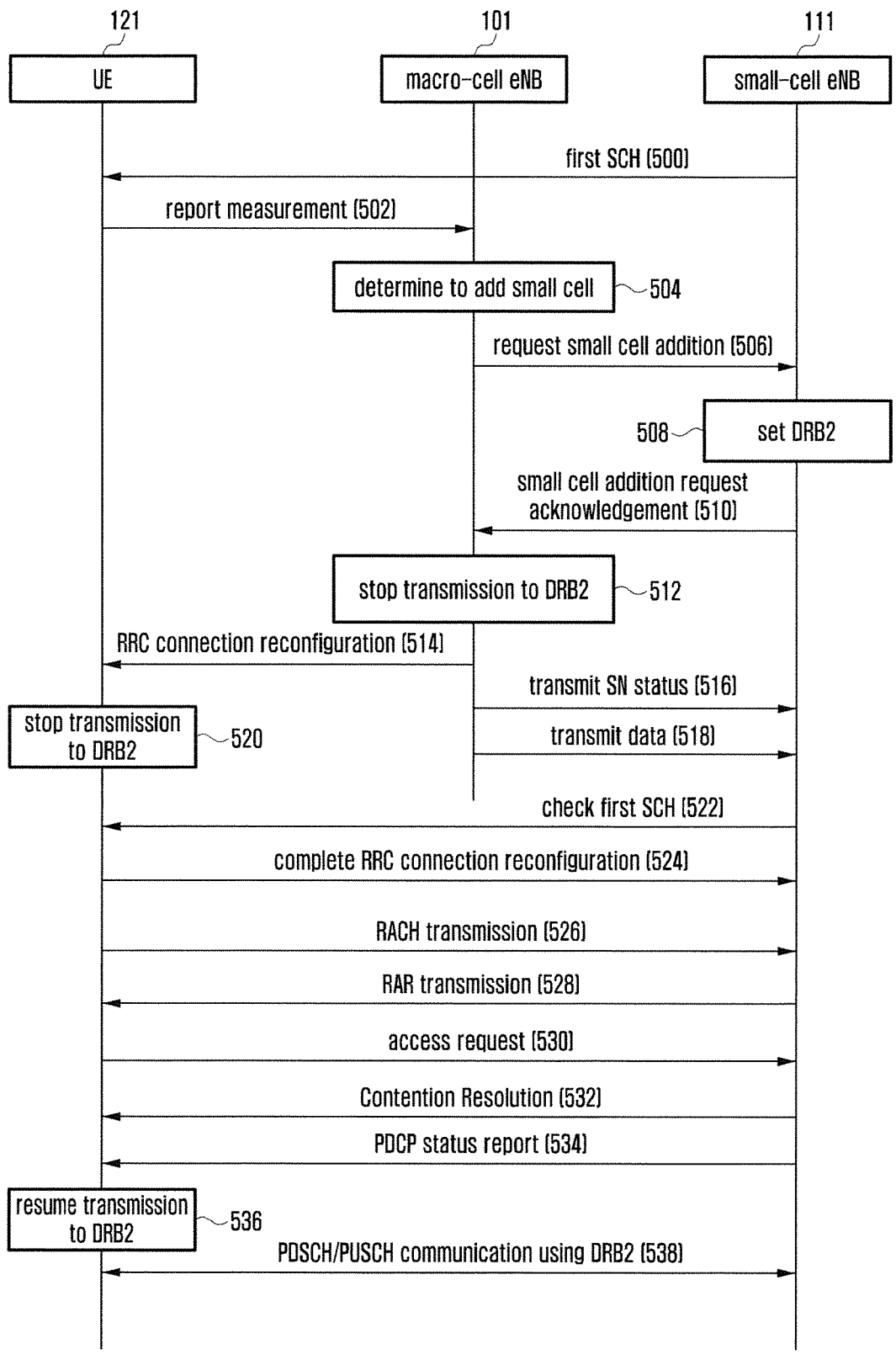

CHANNEL ACCESSING METHOD AND DEVICE IN WIRELESS COMMUNICATION SYSTEM

TECHNICAL FIELD

The present invention relates to a channel access method and apparatus in a wireless communication system, and more particularly, to a channel access method and apparatus in a wireless communication system using a number of beams when handing over a call of UE.

BACKGROUND ART

Wireless communication technology has been researched and developed to increase the amount of transmission data and the data transmission rate via user equipment (UE) or eNBs. In order to perform communication between UE and an eNB, they need to be synchronized with each other and thus can transmit/receive data to/from each other. In this case, a link or channel for communication from UE to an eNB is called "uplink," and a link or channel for communication from an eNB to UE is called "downlink."

In order to obtain synchronization between UE and an eNB in a wireless communication system, UE is capable of obtaining time synchronization via a Synchronization CHannel (SCH) as a downlink from an eNB via. In this case, the synchronization information that UE obtained via SCH receives data in the downlink and may be synchronization information required to transmit data in the uplink. If UE needs to perform data communication with an eNB, it may request access from the eNB via an uplink Random Access CHannel (RACH). When UE performs an access procedure to an eNB via an RACH, it sequentially increases uplink power and performs the transmission of an RACH preamble. If UE transmits an RACH preamble to the eNB with an appropriate level of power, the eNB may receive the RACH preamble. If the eNB receives an RACH preamble, it may create an RACH Response (RAR) message and transmit the RAR message to the UE. Therefore, the UE is capable of ascertaining a level of power which is suitable for the uplink transmission. In addition, the operation described above may also allow the eNB to set up a transmission time difference or Timing Advanced (TA) between the UE and the eNB as well as a level of power for the uplink transmission.

In recent years, a beamforming technique as a system for transmitting a relatively large amount of data at high rate has been used for various wireless communication technologies. In a state where both UE and an eNB employ a beamforming technique, if a procedure for accessing an eNB via an RACH is performed, an RACH preamble transmission needs to be performed according to transmission beams and reception beams. That is, if an eNB and UE, employing a beamforming technique, need to perform an RACH procedure, they need to scan and measure all beams, and determine the best uplink transmission beam and the best reception beam among the measured beams.

In a state where both UE and an eNB employ a beamforming technique, if the UE transmits, to the eNB, an RACH preamble for the initial access, it needs to increase the number of transmission beams and reception beams and thus increases the burden of control to measure and determine a best beam for the beamforming. In addition, the increase in the number of transmission beams and reception beams causes time delay in determining the best transmission beam and reception beam. In particular, in an environment where a macro-cell and a small cell are overlapped, the increase in the initial access time to every eNB and the burden of control causes a corresponding cell to increase its load and also to transmit a relatively large amount of RACH preambles, causing interference with other channels.

DISCLOSURE OF INVENTION

Technical Problem

The present invention has been made to address the above problems and disadvantages, and to provide at least the advantages described below. Accordingly, the present invention provides a method and apparatus for reducing initial access time between UE and an eNB.

The present invention further provides a method and apparatus for reducing interference between UE and eNB, both of which are employing a beamforming technique, caused when the UE and eNB perform initial access.

The present invention further provides a method and apparatus for efficiently performing initial access in an environment where a macro-cell and a small cell eNB are overlapped.

The present invention further provides a method and apparatus for reducing initial access time between UE and eNB, both of which are employing a beamforming technique.

Solution to Problem

In accordance with an aspect of the present invention, a channel access method in a wireless communication system is provided for a macro cell eNB to perform control operations, when UE in the process of communication with the macro-cell eNB performs channel-access to a small cell eNB, in a wireless network capable of using a number of transmission/reception beams. The method includes: determining whether to request a channel setup for a call of the UE from the small cell eNB when an RSSI measurement report regarding a Synchronization CHannel (SCH) of the small cell eNB is received from the UE; providing the small cell eNB with a request message which includes recommendation information regarding a transmission/reception beam of the UE and/or location information regarding the UE if a channel setup is requested from the small cell eNB; stopping the transmission of data to a data radio bearer (DRB2) set up with the UE if a response message for accepting the channel setup with the UE is received from the small cell eNB; transmitting a radio resource control (RRC) Connection Reconfiguration message to the UE to communicate with the small cell eNB; and providing the small cell eNB with information related to data to be transmitted to the UE.

In accordance with another aspect of the present invention, a channel access method is provided for a small cell eNB to set up a channel with UE which is in the process of communication with a macro-cell eNB in a wireless network capable of using a number of transmission/reception beams. The method includes: receiving a message for requesting the setup of a channel with the UE from the macro-cell eNB, setting up a data radio bearer (DRB2) to communicate with the UE, and transmitting a response (acknowledgement) message to the macro-cell eNB; receiving, from the macro-cell eNB, information related to data to be transmitted to the UE; reordering the order of beams to receive a preamble via an RACH from the UE, based on information included in the request message, and scanning the RACH; and receiving a preamble signal of the UE via the RACH, creating an RACH response signal, transmitting the RACH response signal to the UE, and performing a procedure for setting up a channel.

In accordance with another aspect of the present invention, a channel access method is provided for UE, connected to a first eNB, to access a second eNB, in a wireless communication system capable of using a number of transmission/reception beams. the method includes: measuring an RSSI of the second eNB and reporting the RSSI to the first eNB; receiving, from the first eNB, a radio resource control (RRC) Connection Reconfiguration message for assessing the second eNB, stopping a data radio bearer (DRB2) with the first eNB, and transmitting an RRC Connection Reconfiguration complete message to the second eNB; transmitting a preamble through an RACH of the second eNB, using a best one of a number of transmission beams, based on the received RRC Connection Reconfiguration message; and performing a procedure for communicating with the second eNB if an RACH response (RAR) is received from the second eNB.

In accordance with another aspect of the present invention, a channel access apparatus of a macro-cell eNB in a wireless communication system is provided for supporting UE, in the process of communication with the macro-cell eNB, to perform channel-access to a small cell eNB, in a wireless network capable of using a number of transmission/reception beams. The apparatus includes: an antenna unit with a number of antennas for creating a number of transmission/reception beams; a radio frequency (RF) unit with a number of RF modules for communicating with UEs under the macro-cell eNB via the antenna unit; a data processor for modulating and decoding data to be transmitted to the RF unit and demodulating and decoding data received from the RF unit; an inter-eNB interface communicating with another eNB, including the small-cell eNB; and a scheduler for: determining whether to request a channel setup for a call of the UE from the small cell eNB when an RSSI measurement report regarding a Synchronization CHannel (SCH) of the small cell eNB, transmitted by the UE, is received from the data processor; providing the small cell eNB with a message for requesting channel access to the UE which includes recommendation information regarding a transmission/reception beam of the UE and/or location information regarding the UE, using the inter-eNB interface, if a channel setup is requested from the small cell eNB; controlling the RF unit and the data processor to stop the transmission of data to a data radio bearer (DBR2) set up with the UE if a response message for accepting the channel setup with the UE is received from the small cell eNB; transmitting a radio resource control (RRC) Connection Reconfiguration message to the UE to communicate with the small cell eNB; and providing the small cell eNB with information related to data to be transmitted to the UE.

In accordance with another aspect of the present invention, a channel access apparatus of a small-cell eNB in a wireless communication system is provided for supporting UE, in the process of communication with a macro-cell eNB, to perform channel-access to the small cell eNB, in a wireless network capable of using a number of transmission/reception beams. The apparatus includes: an antenna unit with a number of antennas for creating a number of transmission/reception beams; a radio frequency (RF) unit with a number of RF modules for communicating with UEs under the small-cell eNB via the antenna unit; a data processor for modulating and decoding data to be transmitted to the RF unit and demodulating and decoding data received from the RF unit; an inter-eNB interface communicating with another eNB, including the macro-cell eNB; and a scheduler for: receiving a request message for requesting the setup of a channel with the UE from the macro-cell eNB via the inter-eNB interface, setting up a data radio bearer (DBR2) to communicate with the UE, and transmitting a response (acknowledgement) message to the macro-cell eNB; receiving, from the macro-cell eNB, information related to data to be transmitted to the UE; reordering the order of beams to receive a preamble from the UE via an RACH, based on information included in the request message; controlling the RF unit to scan the RACH according to the order of reordered reception beams; controlling, when receiving a preamble signal of the UE via the RACH, the data processor and the RF unit to transmit an RACH response signal to the UE; and performing a procedure for setting up a channel with the UE.

In accordance with another aspect of the present invention, a channel access apparatus is provided for UE, in the process of communication with a macro-cell eNB, to perform channel access to a small-cell eNB in a wireless network capable of using a number of transmission/reception beams. The apparatus includes: an antenna unit with a number of antennas for creating a number of transmission/reception beams; a radio frequency (RF) unit for communicating with two or more eNBs; a data processor for modulating and decoding data to be transmitted to the RF unit and demodulating and decoding data received from the RF unit; and a controller for: controlling the RF unit and the data processor to measure an RSSI of the second eNB in a state where the UE is connected to the first eNB and report the RSSI to the first eNB; receiving, from the first eNB, a radio resource control (RRC) Connection Reconfiguration message for assessing the second eNB, stopping a data radio bearer (DBR2) with the first eNB, and transmitting an RRC Connection Reconfiguration complete message to the second eNB; transmitting a preamble through an RACH of the second eNB, using a best one of a number of transmission beams, based on the received RRC Connection Reconfiguration message; and controlling a procedure for communicating with the second eNB if an RACH response (RAR) is received from the second eNB.

Advantageous Effects of Invention

The present invention is capable of reducing initial access time delay between UE and an eNB in a wireless communication system using a beamforming technique, and also interference between UE and the eNB in the initial access. The present invention is also capable of performing initial access rapidly and efficiently in an environment where a macro-cell and a small cell eNB are overlapped.

BRIEF DESCRIPTION OF DRAWINGS

FIG. 5 is a signal flow chart of the initial access when UE, connected to a macro-cell eNB, attempts to access a small-cell eNB, according to the present invention.

MODE FOR THE INVENTION

Various embodiments of the present invention are described in detail with reference to the accompanying drawings. The same reference numbers are used throughout the drawings to refer to the same or similar parts. It should be understood that the accompanying drawings are merely provided to assist in a comprehensive understanding of the invention and are not suggestive of limitation in terms of form, arrangement, etc. Detailed descriptions of well-known functions and structures incorporated herein may be omitted to avoid obscuring the subject matter of the invention. In the description of the invention, certain detailed explanations of related art are omitted when it is deemed that they may unnecessarily obscure the essence of the invention.

Figure 1:
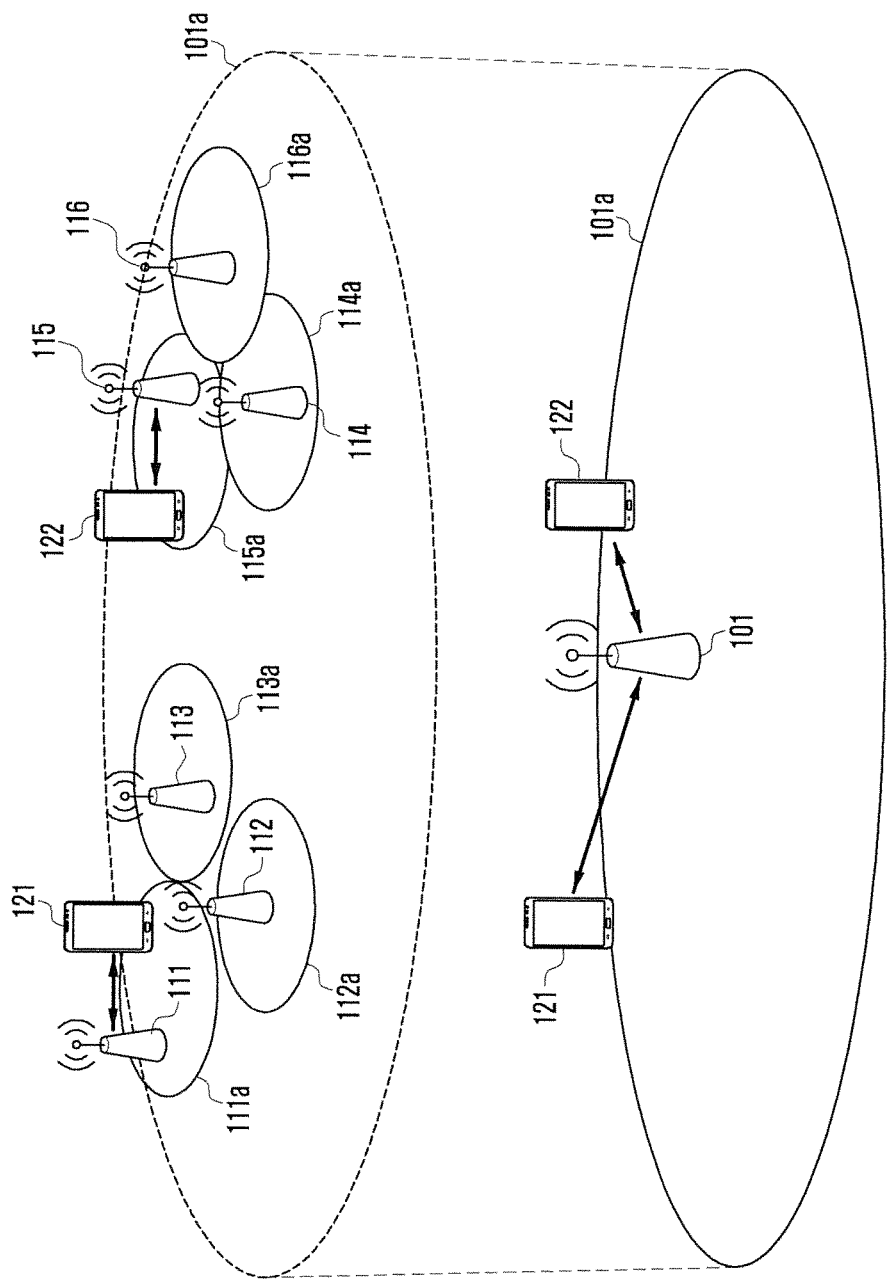
FIG. 1 is a conceptual diagram that describes a system model where a macro-cell and small cell are capable of connecting to UE, simultaneously, overlappingly.

FIG. 1 is a conceptual diagram that describes a system model where a macro-cell and small cell are capable of connecting to UE, simultaneously, overlappingly.

With reference to FIG. 1, the system model includes one macro-cell eNB 101, a number of small cell eNBs 111, 112, 113, 114, 115, and 116 and different UEs 121 and 122.

The macro-cell eNB 101 has a macro-cell coverage area 101a and is capable of providing communication and mobility to UEs 121 and 122 in the macro-cell coverage area 101a. A number of small cell eNBs 111, 112, 113, 114, 115, and 116 may be included in the macro-cell coverage area 101a.

Small cell eNBs 111, 112, 113, 114, 115 and 116 may have small cell coverage areas 111a, 112a, 113a, 114a, 115a and 116a, respectively. Data communication may be supported by UEs 121 and 122 located in their respective areas. In this case, each of the UEs 121 and 122 is capable of receiving a data service at a data rate higher than it receives a data serve from the small cell eNBs 111, 112, 113, 114, 115 and 116 than that it receives a data service from the macro-cell eNB 101. These small cell eNBs 111, 112, 113, 114, 115 and 116 may be eNBs using millimeter wave.

That is, the conceptual diagram of FIG. 1 shows a model where a macro-cell eNB 101, covering a relatively large coverage area in a substantially identical area, and small cell eNBs 111, 112, 113, 114, 115 and 116, each of which has a relatively small coverage area overlapping with part of the coverage area of the macro-cell eNB 101, coexist. The macro-cell eNB 101 has a macro-cell eNB coverage area 101a. In addition, the first small cell eNB 111 has a first small cell eNB coverage area 111a. The second small cell eNB 112 has a second small cell eNB coverage area 112a. The third small cell eNB 113 has a third small cell eNB coverage area 113a. The fourth small cell eNB 114 has a first small cell eNB coverage area 114a. The fifth small cell eNB 115 has a fifth small cell eNB coverage area 115a.

If configured as described above, the small cell eNBs 111, 112, 113, 114, 115 and 116 are capable of increasing the cell capacity efficiently and offloading the user traffic. In addition, the macro-cell eNB 101 is capable of supporting service coverage to UEs 121 and 122 respectively, thereby reducing the number of small cell eNBs cost-effectively and implementing an effective network.

For example, as shown in FIG. 1, the first UE 121 is capable of receiving: the support of a service coverage area 101a from the macro-cell eNB 101; and data, at a high rate, from the first small cell eNB 111. Similarly, the second UE 122 is capable of receiving: the support of a service coverage area 101a from the macro-cell eNB 101; and a high rate data service from the fifth small cell eNB 115. Therefore, the first UE 121 and the second UE 122, connected to the macro-cell eNB 101, may be in a dual connectivity state where they are simultaneously connected to the first small cell eNB 111 and fifth small cell 115, respectively.

In the following description, a method of simplifying an initial access RACH beam scan procedure according to the present invention is explained with reference to the system model shown in FIG. 1. It should, however, be understood that the present invention may also be applied to an embodiment where UE, connected to a number of eNBs, performs initial access to an additional eNB.

Figure 2A:
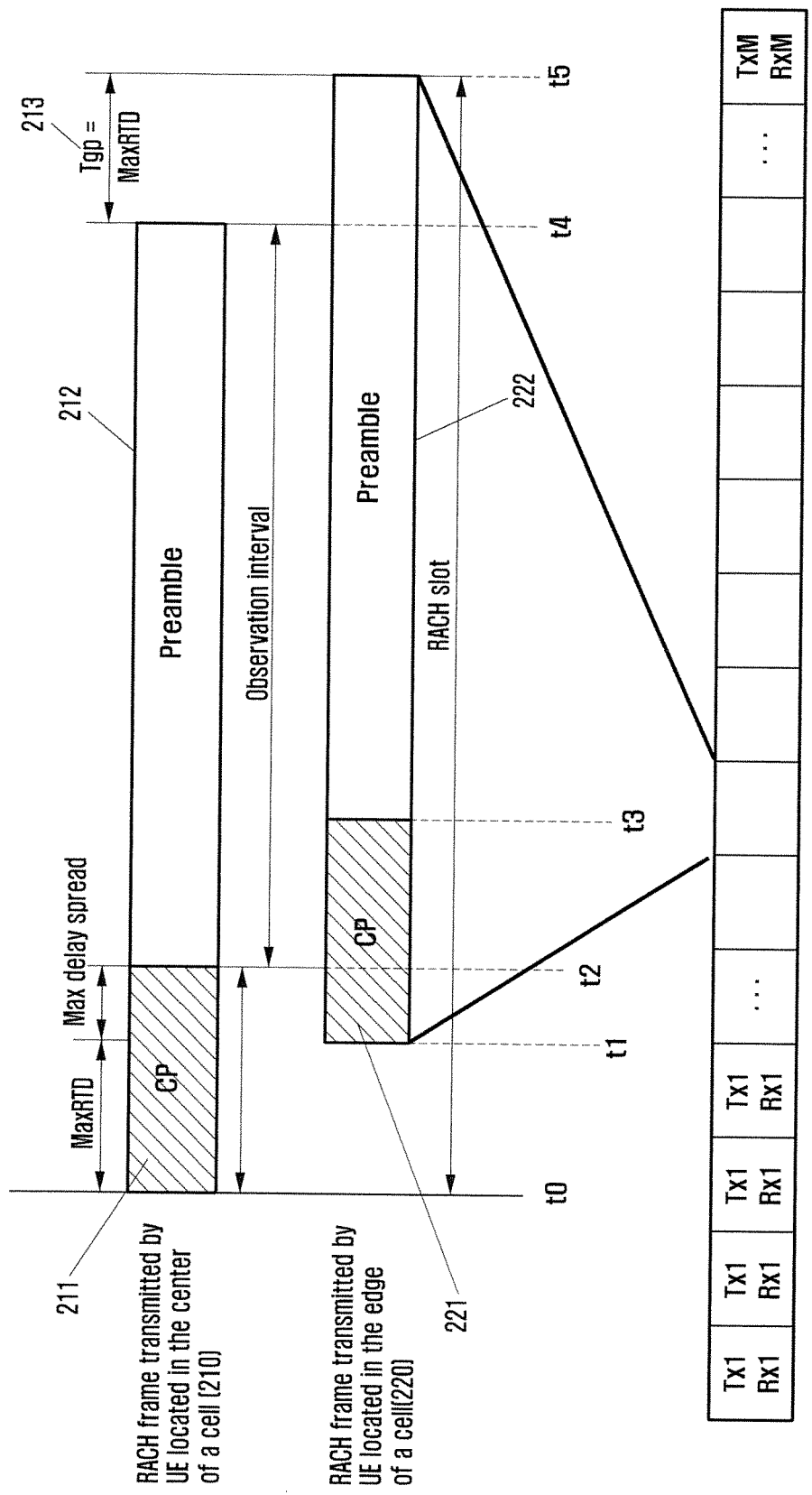
FIG. 2A is a diagram that describes the expanded structure of an RACH frame, according to the number of transmission/reception beams, performing the beamforming transmission in a wireless communication system according to the present invention.

FIG. 2A is a diagram that describes the structure of an RACH frame in a wireless communication system according to the present invention.

With reference to FIG. 2A, a frame has a number of transmission Tx1 and reception Rx1 cycles, each of which may have the same structure. FIG. 2A is an embodiment showing an RACH frame 210 transmitted by UE located at the center of a cell and an RACH frame 220 transmitted by UE located at the edge of a cell.

With reference to the RACH frame 210 transmitted by UE located at the center of a cell, the structure of an RACH frame is divided into three parts: a Cyclic Prefix (CP) 211, a preamble 212 and a time gap (Tgp) 213. Therefore, the overall length of an RACH frame (RACH slot) may be timing points t0 to t5 as described above.

As shown in FIG. 2A, when an eNB receives an RACH frame 210 from UE located at the center of a cell at timing point t0, it receives an RACH frame 220 from UE located at the edge of a cell at timing point t1. As such, since distances between an eNB and UEs in the coverage area of the eNB varies depending on locations of the UEs, the magnitudes of CPs 211 and 221 may be determined according to the size of the coverage area of the eNB. This is to complement the variation of arrival time of data in the uplink due to the variation of distance between an eNB and individual UEs. Therefore, the length of each of the CPs 211 and 221 is a value summing a Round Trip Delay (RTD) up to UE at a cell boundary and a maximum delay spread error of a multi-path. In this case, a maximum delay spread errors may vary depending on eNB coverage areas.

Preamble refers to a sequence to identify UE attempting to perform Random Access. The longer the distance from an eNB to UE, the greater the length of time of a preamble to be required. That is, the length of a preamble may be determined, based on a magnitude, a delay time, etc., of an eNB. A time gap (Tgp) 213 may be set to a value within the maximum RTD.

As shown in FIG. 2A, with respect to the RACH frame 210 transmitted by UE located at the center of a cell, a CP has transmission timing points from t0 to t2; a preamble has transmission timing points from t2 to t4; and a time gap Tgp 213 has transmission timing points from t4 to t5. With respect to the RACH frame 220 transmitted by UE located at the edge of a cell, a CP has transmission timing points from t1 to t3; a preamble has transmission timing points from t3 to t5; and a time gap Tgp does not exist since the UE at the edge of a cell does not have a time gap.

The RACH frame described above is an example when omni-directional transmission is performed. Therefore, preambles are increased by multiples of the number of a transmission beam and a reception beam in a system performing the beamforming transmission. Therefore, the system performing the beamforming transmission is disadvantageous because: the burden of control, such as beamforming scan, is increased in the RACH process; and the handover delay and the burden of control for RACH is increased because of the frequent occurrence of cell change when supporting the mobility.

If the beamforming is performed, UE needs time to transmit RACH to an eNB, i.e., a minimum required time "Tcp+min (Tpreamble)+Tgp" described above. Therefore, UE needs an RACH transmission time of 25 μs or more every beam pair. Based on the result, assuming that: 40 slots correspond to 1 ms (20 slots for UL); a slot length is 25 μs; an eNB uses 27 transmission/reception beams; and UE uses 9 transmission/reception beams, the overall RACH needs 3 frames to be swept, i.e., 12.15 ms. That is, since a relatively large amount of time is required to perform the process described above, this may lower the service quality when: communication starts, handover is performed, etc.

The following description provides examples when an RACH is transmitted to an eNB performing the directional beamforming and an RACH is transmitted to an omni-directional eNB, explained with reference to FIGS. 2B and 2C.

Figure 2B:
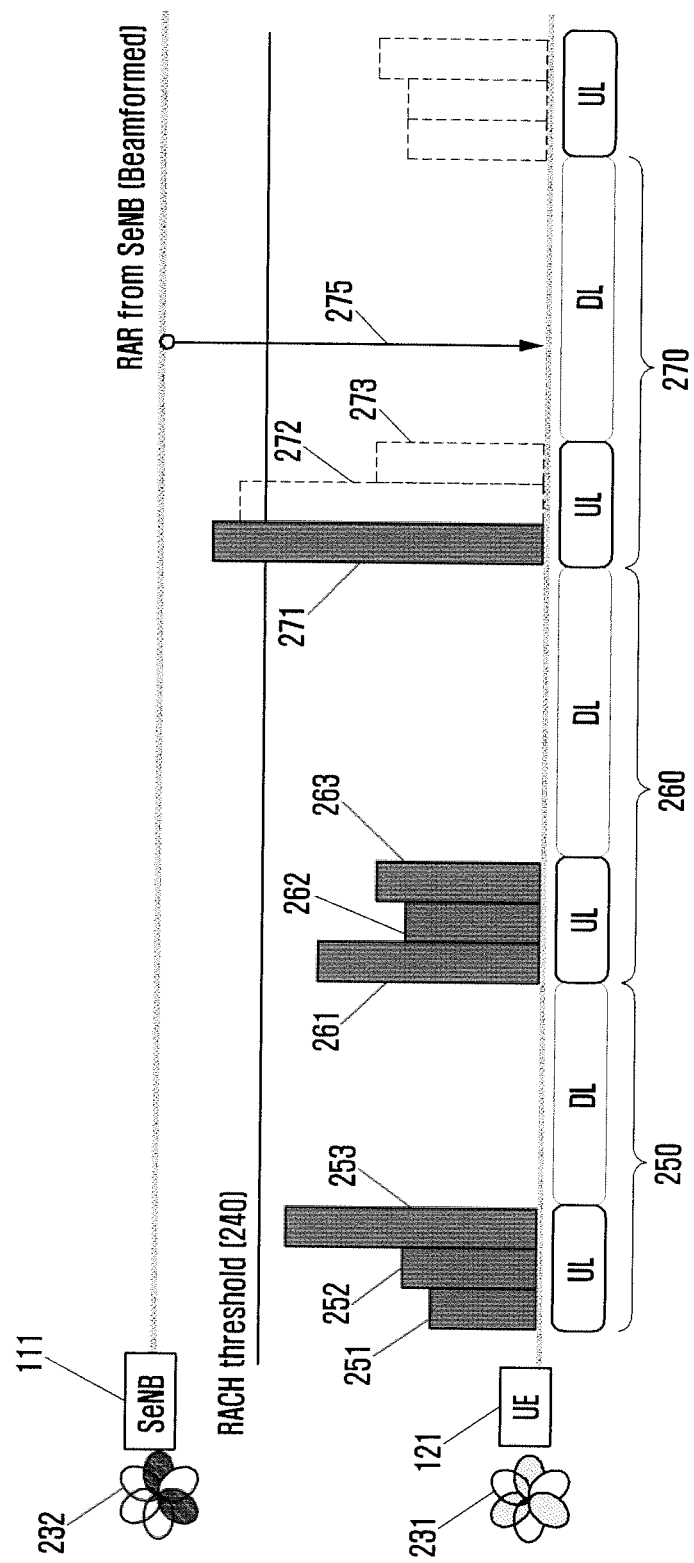
FIG. 2B is a timing chart for the transmission/reception of RACH and RAR between UE and a small cell eNB performing the directional beamforming.

FIG. 2B is a timing chart for the transmission/reception of RACH and RAR between UE and a small cell eNB performing the directional beamforming.

With reference to FIG. 2B, UE 121 is capable of performing the beamforming in various directions as indicated by reference numbers 231, and a small cell eNB 111 is also capable of performing the beamforming in various directions as indicated by reference numbers 232.

In this case, UE 121 and eNB are capable of performing the transmission and reception in a unit of period including a transmission interval Tx and a reception interval Rx, indicated by reference numbers 250, 260 and 270, shown in FIG. 2A. From the point of view of UE 121, the transmission Tx may be referred to as transmission in the uplink (UL) and the reception Rx may be referred to as transmission in the downlink (DL). In contrast, from the point of view of a small cell eNB, the transmission Tx may be referred to as transmission in the downlink (DL) and the reception Rx may be referred to as transmission in the uplink (UL).

As shown in FIG. 2B, UE 121 is capable of transmitting RACH, in the uplink (UL), during a first period 250, as reference numbers 251, 252 and 253. Reference numbers 251, 252 and 253 may be referred to as: energy levels of UE 121; and transmission beams through which UE 121 every reference number may transmit in all beam directions or a single beam direction. Therefore, UE 121 is capable of transmitting RACH to a small cell eNB in a transmission beam direction, with increasing transmission power, during a first period 250.

In this case, an RACH threshold 240 shown in FIG. 2B may be a preset threshold from the point of view of the small cell eNB 111. That is, only if the small cell eNB 111 receives a signal of an RACH threshold 240 or more, it transmits an RAR as the RACH response to UE.

With reference to FIG. 2B, all RACHs that UE 121 sent during the first interval 250 have power less than an RACH threshold. Therefore, the small cell eNB 111 does not transmit an RAR signal to UE. Therefore, the UE 121 waits until the downlink (DL) transmission of the first interval 250 is completed, and then may re-transmit an RACH to the small cell eNB 111, by performing the beamforming, during the second interval 260, as in reference numbers 261, 262 and 263. The embodiment illustrated in FIG. 2B shows that an RACH threshold is not satisfied during the second interval 260. Therefore, the UE 121 waits until the downlink (DL) transmission of the second interval 260 is completed and then may re-transmit an RACH to the small cell eNB 111, by performing the beamforming, during the third interval 270, as in reference numbers 272 and 273.

According to the embodiment shown in FIG. 2B, the first RACH 271 and the second RACH 272 of the third interval 270 may be transmitted if the signal exceeds an RACH threshold of an eNB.

After that, the small cell eNB 111 is capable of transmitting an RAR to the UE 121 in the downlink (DL) during the third interval 270. In this case, the small cell eNB 111 is capable of transmitting an RAR 275, corresponding to the RACH 271 that the UE 121 first transmitted during the third interval 270, to the UE 121 in the downlink (DL) during the third interval 270. If the small cell eNB 111 receives two or more RACHs greater than the RACH threshold 240 from the same UE, it may transmit an RAR in a beamforming direction with the maximum RACH power level. If the small cell eNB 111 has assigned a corresponding beamforming direction to other UEs or the beam direction may cause serious interference in adjacent UE, it may select another RACH.

Therefore, when UE and an eNB employing the beamforming method described above perform the initial access, it takes relatively much time to complete the initial access in the best beamforming direction because of uplink and downlink transmission time.

Figure 2C:
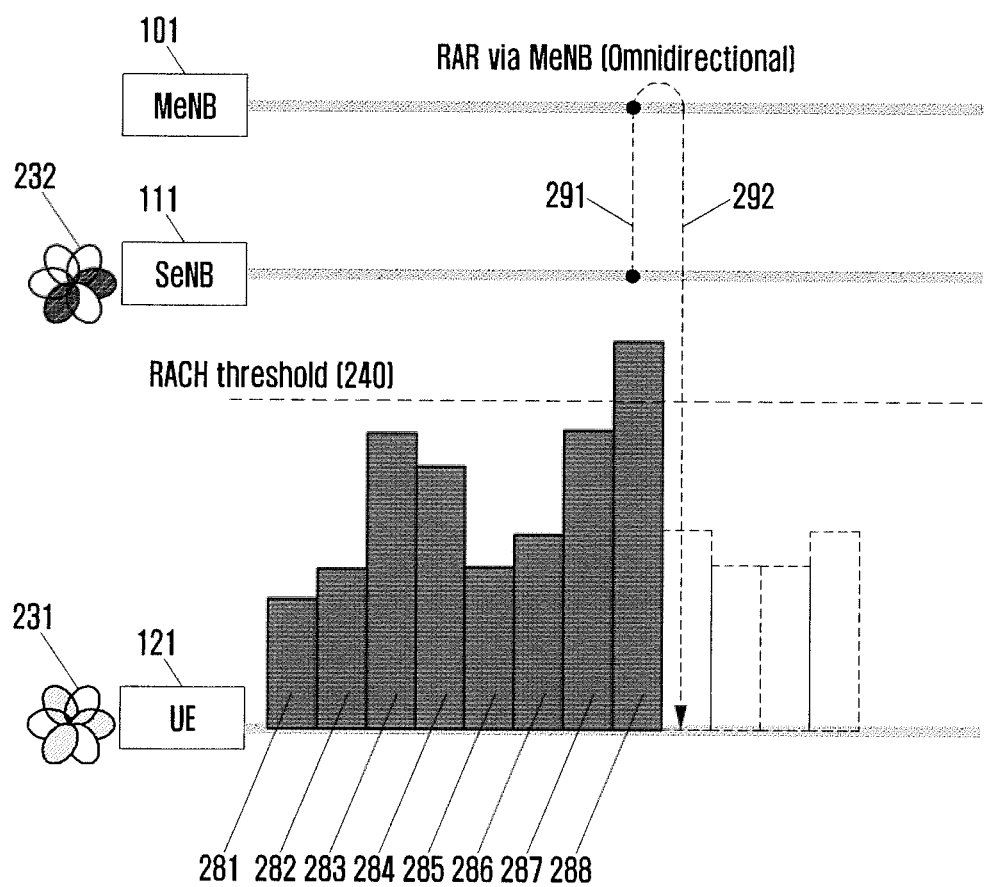
FIG. 2C is a timing chart for the transmission/reception of RACH and RAR between UE and a directional eNB, using an omni-directional eNB.

FIG. 2C is a timing chart for the transmission/reception of RACH and RAR between UE and a directional eNB, using an omni-directional eNB.

With reference to FIG. 2C, UE 121 is capable of performing the beamforming in various directions as indicated by reference number 231, and a small cell eNB 111 is also capable of performing the beamforming in various directions as indicated by reference numbers 232. However, a macro-cell eNB 101 serving as an omni-directional eNB does not perform the beamforming.

As shown in FIG. 2C, UE 121 performs the beamforming in various beam directions and transmits, to the small cell eNB 111, RACHs as indicated by reference numbers 281, 282, 283, 284, 285, 286, 287, 288, . . . . In this case, if the small cell eNB 111 receives an RACH greater than an RACH threshold 240, it does not directly transmit, to the UE 121, a response signal for the RACH, but transmits an RAR signal to the macro-cell eNB 101 as indicated by reference number 291. In this case, the macro-cell eNB 101 serving as an omni-directional eNB transmits, to the UE 111, an RAR 292 as a response for the RACH, instead of the small cell eNB 111. The RAR contains information provided by the small cell eNB 111.

Therefore, as described above refereeing to FIG. 2C, if the small cell eNB 111 transmits the RAR as a response for the RACH by using the macro-cell eNB 101, instead of directly transmitting it, the RAR may be transmitted to the UE 121 at a relatively high speed, so that the initial access between the UE 121 and the small cell eNB 111 can be completed.

Figure 3:
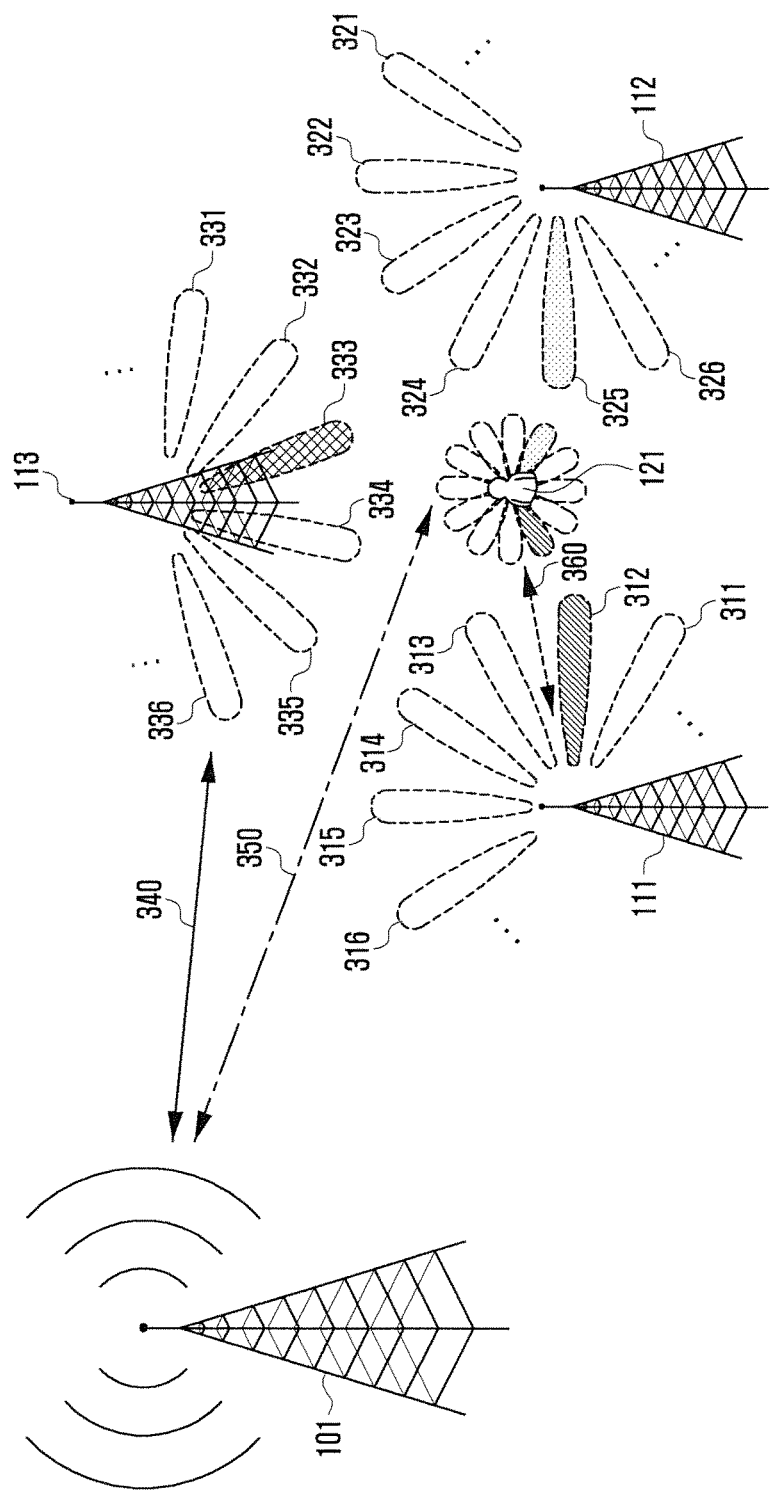
FIG. 3 is a diagram that describes a method for UE to scan beams in a wireless communication system where a macro-cell and a small cell which are overlapped, when the UE is simultaneously connected to the macro-cell and the small cell.

FIG. 3 is a diagram that describes a method for UE to scan beams in a wireless communication system where a macro-cell and a small cell which are overlapped, when the UE is simultaneously connected to the macro-cell and the small cell.

Since the embodiment of FIG. 3 is identical in configuration to that of FIG. 1, the macro-cell eNB 101 and the small cell eNBs 111, 112, and 113 are illustrated in detail to be distinguished from the embodiment of FIG. 1. The macro-cell eNB 101 and the small cell eNBs 111, 112 and 113 are connected to each other with an interface 340. Since the interface may vary depending on systems, the present invention is not limited to the types of interface.

As shown in FIG. 3, each of the small cell eNB 111, 112 and 113 is capable of transmitting signals in a number of directions by performing the beamforming. For example, the first small cell eNB 111 is capable of beamforming in a number of directions 311, 312, 313, 314, 315, 316, . . . , and the second small cell eNB 112 is capable of beamforming in a number of directions 321, 322, 323, 324, 325, 326, . . . . Similarly, the third small cell eNB 113 is capable of beamforming in a number of directions 331, 332, 333, 334, 335, 336, . . . .

UE 121 is connected to the macro-cell 101 as indicated by reference number 350 and communicates therewith through one or more of a number of beams which are beam-formed in one or more directions by the small cell eNBs 111, 112. The embodiment of FIG. 3 shows that: one of the beamforming signals between the first small cell eNB 111 and UE 121 has the best state in the direction of the second beam 312; one of the beamforming signals between the second small cell eNB 112 and UE 121 has the best state in the direction of the fifth beam 325; and one of the beamforming signals between the third small cell eNB 113 and UE 121 has the best state in the direction of the third beam 333. The embodiment of FIG. 3 shows that the first small cell 111 of the small cell eNBs 111, 112, and 113 establishes a channel as indicated by reference number 360.

The following description provides embodiments to determine a best beamforming signal between UE 121 and the small cell eNBs 111, 112, and 113, which are explained with reference to FIGS. 4A to 4C.

Figure 4A:
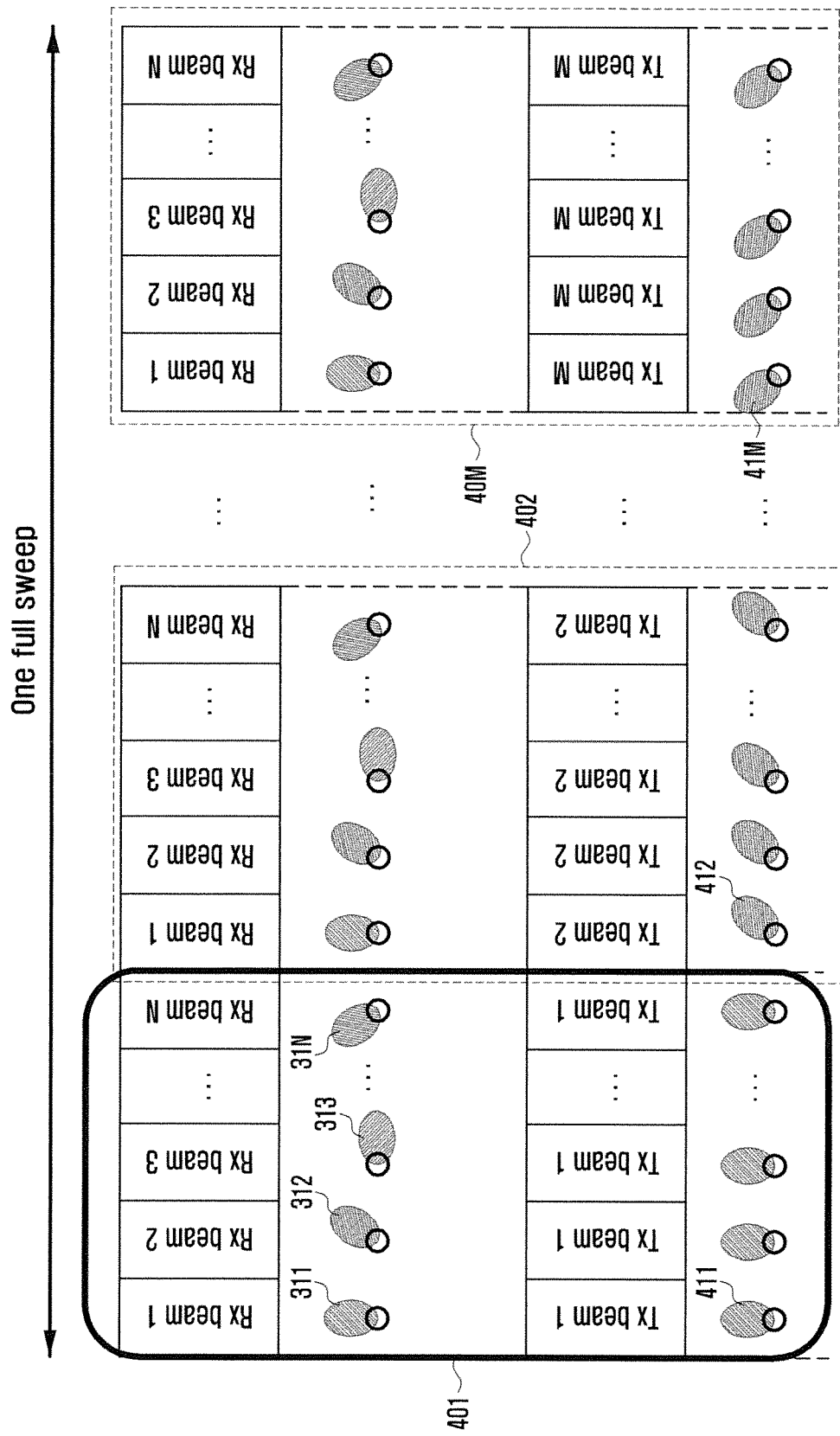
FIG. 4A is a diagram that describes the one time detection of the overall beams by repeating corresponding operations after changing a transmission beam after scanning a reception beam in a state where the transmission beam direction is fixed.

FIG. 4A is a diagram that describes the one time detection of the overall beams by repeating corresponding operations after changing a transmission beam after scanning a reception beam in a state where the transmission beam direction is fixed. FIG. 4B is a diagram that describes the one time detection of the overall beams by repeating corresponding operations after changing a reception beam after scanning a transmission beam in a state where the reception beam direction is fixed. FIG. 4C is a diagram that describes the one time detection of the overall beams by repeatedly scanning beams, according to an existing transmission/reception beam rule, after preferentially scanning a recommended transmission/reception beam.

Figure 4B:
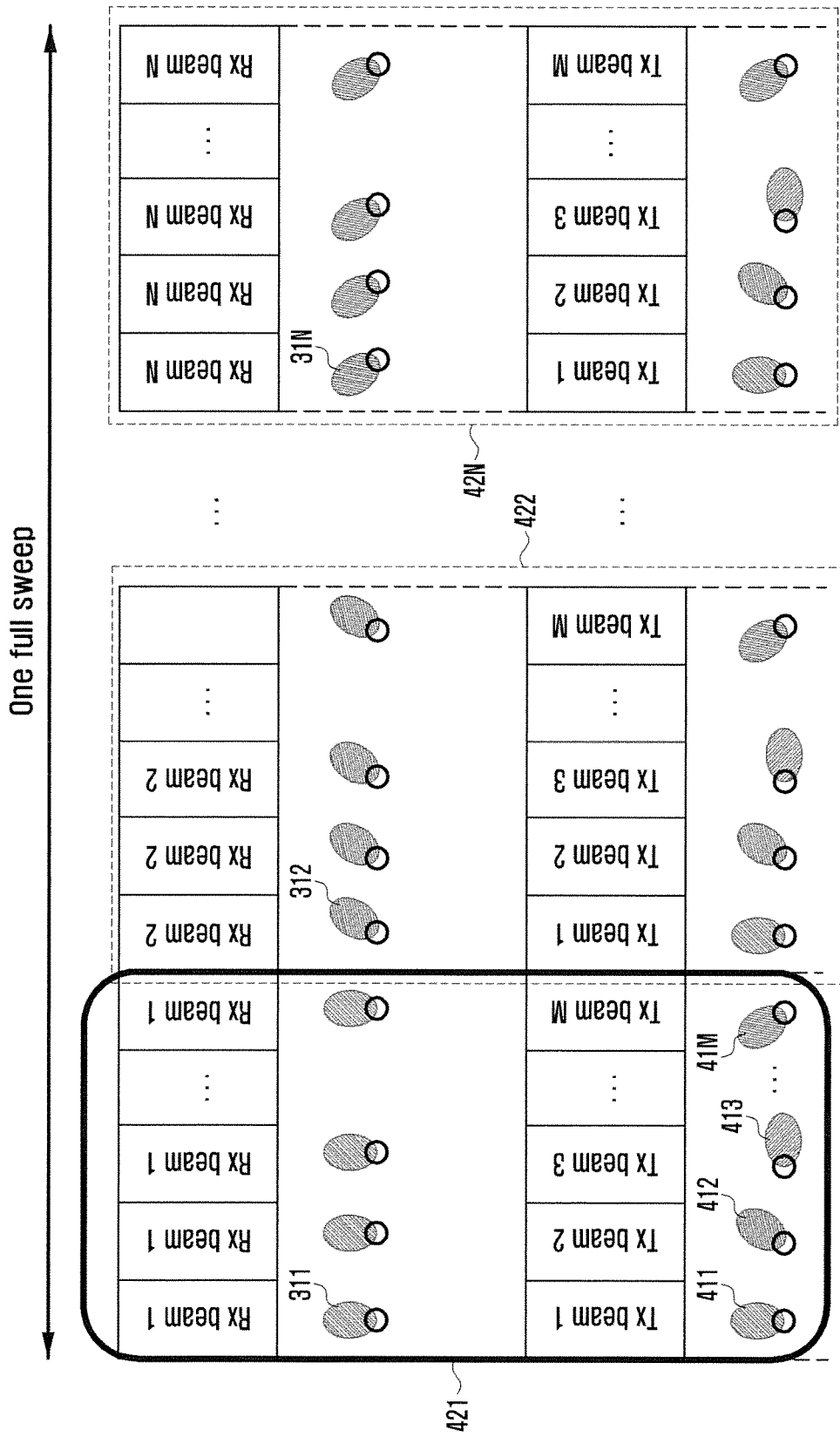
FIG. 4B is a diagram that describes the one time detection of the overall beams by repeating corresponding operations after changing a reception beam after scanning a transmission beam in a state where the reception beam direction is fixed.
Figure 4C:
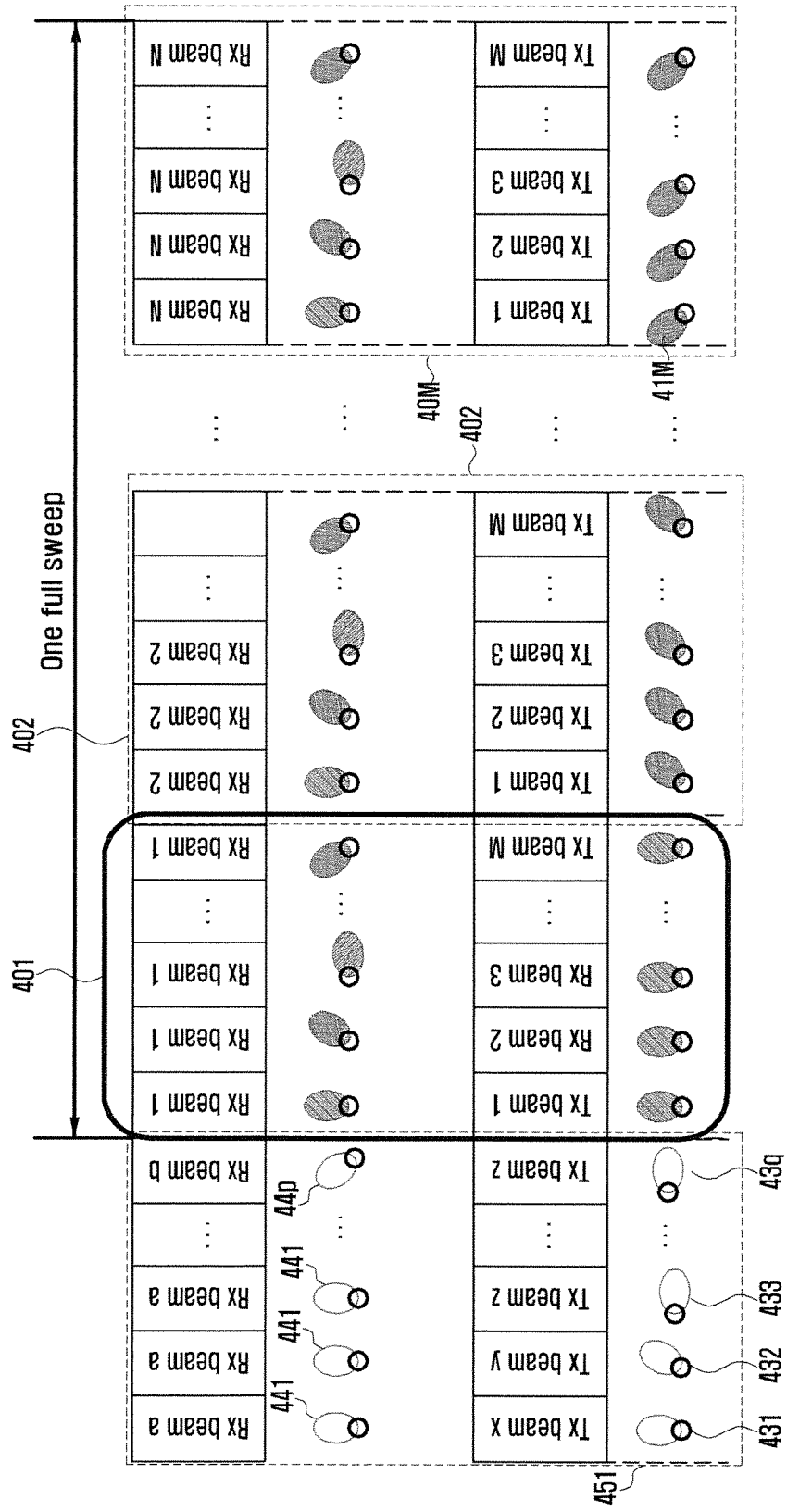
FIG. 4C is a diagram that describes the one time detection of the overall beams by repeatedly scanning beams, according to an existing transmission/reception beam rule, after preferentially scanning a recommended transmission/reception beam.

Embodiments of FIGS. 4A to 4C are described, using the UE 121 and the first small cell eNB 111 shown in FIGS. 1 and 3.

Embodiments of FIGS. 4A to 4C are described, assuming that the number of directions of transmission beam which can be beam formed is M and the number of directions of reception beam which can be beam formed is N. Embodiments of FIGS. 4A to 4C are described, assuming that an eNB receives an RACH channel from UE. Therefore, the transmission beam directions may be beamforming directions that UE transmits a beam in the UL to transmit a preamble via an RACH to a small cell eNB. The reception beam directions may be reception beam directions for an eNB to receive an RACH transmitted from UE by performing beamforming.

FIGS. 4A and 4B show embodiments where, in a state where a specified node, e.g., an eNB or UE, is fixed in one beam direction, a best beam direction is swept with respect to individual beamforming directions of another node.

FIG. 4A is an embodiment for searching for a best beam, with respect to one beam provided by UE serving as a transmission apparatus, using individual reception beams. Therefore, an RACH preamble may be checked on reception beams in N reception beam directions 311, 312, 313, . . . , 31N that the small cell eNB 111 can form with respect to the first beam direction 411 from the UE 121. These processes are shown as in operation 401 of FIG. 4A. Therefore, an RACH preamble may be checked on reception beams in N reception beam directions 311, 312, 313, . . . , 31N that the small cell eNB 111 can form with respect to the second beam direction 412 from the UE 121 in operation 402. This process is performed in such a way that an RACH preamble is checked on reception beams in N reception beam directions 311, 312, 313, . . . , 31N with respect to the $M^{th}$ beam direction 41M as the last beam direction from the UE 121 in operation 40M, thereby performing the full sweep.

With reference to FIG. 4B, in a state where a small cell eNB 111 as a reception apparatus sets N reception beam directions 311, 312, 313, . . . , 31N, which can be formed by the small cell eNB 111, to a single direction, every operation, the small cell eNB 111 performs a checking operation with changing M beam directions which can be provided by the UE 121 as a transmission apparatus. For example, the small cell eNB 111 fixes a first beam direction 311 and checks an RACH preamble with respect to M beam directions 411, 412, 413, . . . , 41M which can be provided by the UE 121 in operation 421. The small cell eNB 111 fixes a second beam direction 312 and checks an RACH preamble with respect to M beam directions 411, 412, 413, . . . , 41M which can be provided by the UE 121 in operation 422. This process is performed in such a way that the small cell eNB 111 fixes the $N^{th}$ beam direction 31N as the last direction of the eNB and checks an RACH preamble with respect to M beam directions 411, 412, 413, . . . , 41M which can be provided by the UE 121 in operation 42N, thereby performing the full sweep.

FIG. 4C is a diagram that describes the one time detection of the overall beams by repeatedly scanning beams, according to an existing transmission/reception beam rule, after preferentially scanning a recommended transmission/reception beam.

With reference to FIG. 4C, beam scan is performed using transmission recommendation beams 431, 432, 433, . . . , 43q and reception recommendation beams 441, . . . , 44p in operation 451. The transmission recommendation beams 431, 432, 433, . . . , 43q and reception recommendation beams 441, . . . , 44p may be recommended based on various information, such as a history regarding UEs located at a location similar to that of corresponding UE when a macro-cell eNB scans beams between the UE and a small cell eNB, information specified when an eNB is installed, etc. As another method, UE may use its history. After that, like the embodiment shown in FIG. 4A or 4B, an attempt may be made to perform the one time detection of all the beams by repeatedly scanning beams according to an existing transmission/reception beam rule. The embodiment of FIG. 4C is an example where a recommendation beam history is checked and then the overall beam scan method shown in FIG. 4A is applied.

The method described above may be a process for checking the entire beam direction which can be used by UE 121 and the entire beam direction which can be used by the small cell eNB 111 and a process for checking the entire transmission/reception beam direction which can be used after a beam scan is performed by using a recommendation beam. Therefore, if the entire beam direction which can be used by UE 121 and the entire beam direction which can be used by the small cell eNB 111 are checked, it takes relatively much time to transmit a preamble via SCH and RACH and to search for a best beam as described above. This result may correspond to a case where the small cell eNB 111 and the macro-cell 101 operate independently.

Therefore, the present invention assumes that the UE 121 is connected to a macro-cell as described above referring to FIG. 3. In this case, the macro-cell eNB 101 provides small cell eNBs 111, 112 and 113 with information obtained from UE 121 and the macro-cell eNB 101, via Xn interface between the macro-cell eNB 101 and small cell eNBs 111, 112 and 113. For example, the macro-cell eNB 101 is capable of providing small cell eNBs 111, 112 and 113 with location information regarding UE 121, channel history regarding UE 121, Use Beam ID Table, etc. When receiving the information described above, the small cell eNBs 111, 112 and 113 is capable of reordering channels to be scanned, based on the received information, thereby completing the initial access fast.

Based on the process, the present invention provides a method and apparatus for setting a best beam direction between the UE 121 and at least one of the small cell eNBs 111, 112 and 113, and a method and apparatus for reducing the initial access time, which are described with reference to the accompanying drawings.

FIG. 5 is a signal flow chart of the initial access when UE, connected to a macro-cell eNB, attempts to access a small-cell eNB, according to the present invention.

UE, a macro-cell eNB and a small cell eNB, shown in FIG. 5, are described, using the configuration referring to in FIGS. 1 and 3. The small cell eNB of FIG. 5 is described, based on the first small cell eNB 111. However, operations between small cell eNBs 112, 113, 114, 115 and 116 and UE 121 and operations between the macro-cell 101 and the small cell eNBs are described with reference to FIG. 5.

The signal flow chart of FIG. 5 is described with the following assumptions. First, it is assumed that UE 121 is connected to a macro-cell eNB 101. That is, UE 121 is synchronized with a macro eNB 101, and can be a state where it can perform communication. It is also assumed that UE 121 attempts to access a small cell eNB 111 via RACH.

If UE 121 and the macro-cell eNB 101 are synchronized with each other, the synchronization error between the UE 121 and the macro-cell eNB 101 may be 1 ms or less, which is referred to as a tight synchronization (tight sych) state. In addition, the small cell eNB 111 and the macro-cell eNB may be in a rough synchronization (rough sych) state. The small cell eNB 111 periodically performs the transmission of a Cell-specific Reference Signal (CRS). Therefore, UE 121 receives a first CRS of the CRS periodically transmitted from the small cell eNB 111 in operation 500.

If UE 121, connected to a macro-cell eNB 101, receives a CRS from a small cell eNB 111, it may have an RF module for transmitting/receiving signals to/from the macro-cell eNB 101 and an RF module for transmitting/receiving signals to/from the small cell eNB 111. That is, UE 121 needs to include a dual RF module.

If UE 121 receives a first SCH from the small cell eNB 111 in operation 500, it obtains synchronization of the small cell eNB 111. UE 121 also measures signals forming beams in each direction to the small cell eNB 111, with obtaining synchronization in operation 500, and checks an RSSI of the measured signals. In this case, UE 121 is capable of setting up a best transmission beam and a reception beam. The transmission beam may be a best beam of the downlink beams provided by the small cell eNB 111. The reception beam may be a beam that UE 121 has formed to receive signals.

UE 121 reports the measured signal RSSI to the macro-cell eNB 101 in operation 502. That is, the UE provides not the small-cell eNB 111 but a macro-cell eNB 101 with the measured result of beam-formed signals of the small cell eNB 111 Therefore, UE 121 is capable of reporting, to the macro-cell eNB 101, identification of a small cell eNB 111 (SeNB ID) and an obtained, best transmission beam identification (DL Tx Beam ID). Alternatively, the UE 121 is capable of reporting, to the macro-cell eNB 101, a best one of the sets of transmission beams and reception beams, instead of the best transmission beam identification. For example, if a set of an $x^{th}$ transmission beam and a $y^{th}$ reception beam, as a measurement result of received beams in operation 500, is the best, the UE 121 is capable of transmitting information regarding the best set to the macro-cell eNB 101.

The UE 121 is capable of including information regarding the eNB and information regarding a transmission or transmission/reception beam in a channel measurement report message, and transmitting the information along with the message to the macro-cell eNB 101. The measurement report message may be transmitted via, e.g., a Radio Resource Control (RRC) message.

The macro-cell eNB 101 receives measured information of the small cell eNB from the UE 121, and determines whether it connects the small cell to the UE 121 to provide services to the UE 121, based on the received information, in operation 504. The determination may be performed, considering various factors, such as a resource, a scheduling of the macro-cell eNB 101, etc.

For example, if a relatively large amount of data needs to be provided to UE 121 at a relatively high speed, it may be more efficient to perform the transmission/reception of data in the small cell eNB 111 than to process the data in the macro-cell eNB 101. There are other examples, e.g., an example where a large number of UEs are connected to the macro-cell eNB 101, so that the eNB approaches a saturation state, an example where the number of US communicating with the small cell eNB 111 is relatively small, etc.

The present invention assumes that the macro-cell eNB 101 adds a small-cell eNB 111 to the UE 121 in order to provide services to the UE 121. Therefore, the flow chart of FIG. 5 shows only operation 504 where the macro-cell eNB 101 determines to connect the small cell eNB 111 to the UE 121.

If the addition of a small cell is determined, the macro-cell eNB 101 provides a small cell addition request (SCELL ADDITION REQUEST) message to the small cell eNB 111 in operation 506. In this case, the SCELL ADDITION REQUEST message that the macro-cell eNB 101 provided with the small cell eNB 111 may be transmitted via a link 340 connecting the macro-cell eNB 101 and the small cell eNB 111.

The SCELL ADDITION REQUEST message that the macro-cell eNB 101 provided with the small cell eNB 111 may contain information regarding the UE 121 (UE Info.), small cell eNB identification (SeNB ID), and information regarding a reported best beam. In addition, the macro-cell eNB 101 may also provide the small cell eNB 111 with additional information to recommend a best beam.

Information obtainable from the UE 121 may be used. For example, if location information using GPS may be obtained from the UE 121, the addition request message may provide GPS-based location information obtained from the UE 121. Although the UE 121 does not use GPS, the macro eNB 101 may provide location information. For example, rough location information regarding UE may be obtained, using a number of eNBs capable of transmitting/receiving signals to/from the UE 121, by the triangulation, and may be provided to the small cell eNB 111.

A beam history that the macro eNB 101 created based on the beam identification table and UE 121 (MeNB build history based Beam ID table), as additional information, may be included in a small cell addition request message. The beam identification table may be information containing a location of UE 121 (UE location) and a beam identification (Beam ID), and may also contain information regarding a best uplink reception beam using the UE location and Beam ID. The beam creation history may also contain information regarding a best downlink transmission beam (best DL Tx beam) and a best uplink reception beam (best UL Rx beam). The information regarding a best uplink reception beam may contain a reception beam history of other UEs as well as information regarding a reception beam using a location of UE 121.

Therefore, the small cell eNB 111 is capable of changing the beam scan information. If the small cell eNB 111 changes beam scan information, a recommendation beam may be used as shown in FIG. 4C. The method for a small cell eNB 111 to change beam scan information may be classified into active and passive methods.

If the small cell eNB 111 employs an active method, it may scan only a selected beam, or selected beams if two or more beams are selected. This may correspond to a case where only operation 451 shown in FIG. 4C is performed.

If the small cell eNB 111 employs a passive method, it may reorder all the beams to be scanned.

More specifically, the passive method may be divided into a process for reordering transmission beams and a process for reordering reception beams. Therefore, the small cell eNB may reorder either or both of transmission beams and reception beams.

If the small cell eNB reorders only reception beams, it does not need to provide specified information to the UE 121. On the other hand, if the small cell eNB reorders transmission beams, it needs to provide feedback to the UE 121. For example, the eNB 111 may provide the UE 121 with position information regarding a best beam. The best beam position information may be information that differs from the best beam identification (ID). UE 121 receives the best beam position information and reorders the transmission order (Tx order) of beams based on the received best beam position information.

The small cell eNB 111 and the macro-cell eNB 101 may have location information, respectively. Therefore, if the small cell eNB 111 receives location information regarding the UE 121 from the macro-cell eNB 101, it is capable of searching for its selectable best beam corresponding to a best beam of the macro-cell eNB 101, based on the UE location information. For example, if it is assumed that the UE 121, the small cell eNB 111 and the macro-cell eNB 101 are arranged in a straight line, and the small cell eNB 111 is located between the UE 121 and the macro-cell eNB 101, a best beamforming direction determined by the macro-cell eNB 101 is likely to be a best direction for the small cell eNB 111.

On the other hand, if it is assumed that the UE 121, the small cell eNB 111 and the macro-cell eNB 101 are arranged in a straight line, and the UE 121 is located between the small cell eNB 111 and the macro-cell eNB 101, a direction, opposite the best beamforming direction of the macro-cell eNB 101, may be a best beamforming direction for the small cell eNB 111 and the UE 121. Therefore, the small cell eNB 111 may have had a table, a calculation method, etc. to recommend a best beamforming direction, according to various UE locations as well as intuitive forms described above.

Therefore, the small cell eNB 111 is capable of setting at least one or more beamforming directions to be estimated as an optimal direction, based on location information regarding the UE 121 and recommendation beamforming information provided by the macro-cell eNB 101. If the small cell eNB 111 has not had the information described above, the macro-cell eNB 101 previously calculates the information described above and provides the small cell eNB 111 with beamforming priority information or recommendation information.

If the small cell eNB 111 receives a small cell addition request message from the macro-cell eNB 101 in operation 506, it sets up a data radio bearer 2 (DBR2) in operation 508. After that, the small cell eNB 111 creates a small cell addition request acknowledgement (Scell addition request ACK) message and transmits it to the macro-cell eNB 101 in operation 510. In this case, the small cell eNB 111 includes its RACH configuration information in the small cell addition request ACK message and transmits the message along with the information to the macro eNB 101.

The macro-cell eNB 101 receives the small cell addition request ACK message in operation 510, and stops the transmission of data to the DRB2 established between the macro cell eNB 101 and the UE 121 in operation 512. After stopping the transmission of data to the DRB2, the macro-cell eNB 101 transmits an RRC Connection Reconfiguration message to the UE 121 in operation 514. In this case, the RRC Connection Reconfiguration message contains the RACH configuration information regarding the small-cell eNB, received via the small cell addition request ACK message from the small cell eNB 111 in operation 510. This is performed to allow the UE 121 to re-check the state of the small-cell eNB 111 if the UE 121 is connected to the small cell eNB 111.

The macro-cell eNB 101 transmits a Sequence Number (SN) status to the small cell eNB 111 in operation 516, and also transmits, to the small cell eNB 111, data to be transmitted to the UE 121 in operation 518. The Sequence Number (SN) may be a Sequence Number (SN) of data that the macro-cell eNB 101 and the UE 121 transmit/receive to/from each other.

UE 121 receives the RRC Connection Reconfiguration message in operation 514, and stops the reception of data from the DRB2 established with the macro-cell eNB 101 in operation 520. After that, the UE 121 is capable of checking whether the small cell eNB 111 and the transmission and reception beams are valid through a best reception beam that the UE 121 obtained via the beam scan process, using a first SCH received from the small cell eNB 111 and the RACH information regarding the small cell eNB, contained in the RRC Connection Reconfiguration message received in operation 514, in operation 522.

If the UE 121 ascertains that the beam information obtained through the beam scan process for the small cell eNB 111 is valid, it creates an RRC Connection Reconfiguration complete message and provides the message to the small cell eNB 111 in operation 524. That is, since the UE 121 stopped the DRB2 established with the macro eNB 101, it has performed the reporting to the small cell eNB 111. In the following description, the case that the UE 121 ascertains that the beam information obtained through the beam scan process for the small cell eNB 111 is not valid is not explained.

After that, the UE 121 performs the RACH transmission in operation 526. If the UE 121 transmitted a preamble via the RACH but has not received an RAR message from the eNB within a preset period of time, it may perform the transmission, with sequentially increasing a level of transmission power, as described above referring to FIGS. 2B and 2C. The UE 121 may randomly transmit an RAR via the RACH. Alternatively, if the UE 121 receives information to recorder transmission beams (UL Tx beam Reordering) (not shown) as described above, it may reorder transmission beams and transmit a preamble via the RACH. Therefore, the RACH transmission may be performed not one time, as in operation 526, but a number of times as described above referring to FIGS. 2B and 2C.

For example, the UE 121 may sequentially transmit a preamble via a RACH, with not a maximum level of power but a first level of power, only in the entire beam direction or preset reordered directions, or according to the reordered order, in operation 526. If the UE 121 has not received an RAR message from the eNB within a predetermined period of time, it transmits a preamble via the RACH with a second level of power which is greater than a first level of power but less than a maximum level of power. The UE 121 repeats the operation described above until it transmits a preamble via the RACH with a maximum level of power or receives an RAR message from the eNB. It should be understood that the present invention may also be implemented in such a way that the UE 121 may not only control power but also reorder transmission beams when transmitting a preamble via the RACH.

The small cell eNB 111 is capable of: selectively reordering beams using information recommended by the macro-cell eNB 101; or preferentially scanning a reception beam based on the recommended information. Therefore, since the small cell eNB 111 performs the scan by the reordering or the selective scan for the preferential scan, based on the recommendation information from the macro-cell 101, it may receive an RACH preamble signal from the UE 121 at a relatively high speed. That is, since a beam-forming direction with a high possibility of success is first scanned, the eNB may fast receive a preamble signal via the RACH.

In the following description, operation 526 is explained in detail with reference to FIGS. 4A to 4C.

(1) It is assumed that reception beams received by the small cell eNB 111 are only reordered. This may be performed for the following three cases.

First, transmission beams received via an RACH are sequentially scanned, using all reordered reception beams.

Second, transmission beams received via an RACH are scanned, using only selected reception beams.

Third, transmission beams received via an RACH are scanned, using only selected reception beams; and transmission beams are scanned, using reception beams not selected, if a preamble is not received via an RACH.

The first case is described, below, with reference to FIG. 4B. The small cell eNB 111 may perform the reordering operation and the scan operation for one transmission beam, based on information regarding best reception beams provided by the macro eNB 101. That is, the first reception beam 311 of operation 421 may be not a randomly ordered beam, but a beam which is estimated as a best beam based on information provided by the macro-cell eNB 101. The second reception beam 312 of operation 422 may be a beam which is estimated as a second best beam based on information provided by the macro-cell eNB 101. All transmission beams for one reception beam, ordered as shown in FIG. 4B, are sequentially scanned.

If the small cell eNB 111 is capable of forming 27 reception beams and is recommended four beams by the macro-cell eNB 101, it may sequentially order the remaining beams except for the first to fourth beams. If information provided by the macro-cell eNB 101 does not contain priority for first to fourth beams, the small-cell eNB 111 may select first to fourth beams in random order. This means that transmission beams are not reordered. Therefore, the small cell eNB 111 may select transmission beams in random order. For example, as shown in FIG. 4B, all transmission beams 411, 412, 413, . . . , 41M for one reception beam may be sequentially scanned.

Therefore, the small cell eNB 101 is capable of scanning individual transmission beams 411, 412, . . . , 41M received from the UE 121, using the method described above.

The second case, where transmission beams received via an RACH are scanned, using only selected reception beams, is described, below, with reference to FIG. 4A.

The small cell eNB 111 may perform the reordering operation and the scan operation for one transmission beam, based on information regarding best reception beams provided by the macro eNB 101. In this case, the selected reception beams may be beams recommended by the eNB 101. That is, the first reception beam 311 of operation 401 may be not a randomly ordered beam, but a beam which is estimated as a best beam based on information provided by the macro-cell eNB 101. The second reception beam 312 may be a beam which is estimated as a second best beam based on information provided by the macro-cell eNB 101.

If the small cell eNB 111 is capable of forming 27 reception beams and is recommended four beams by the macro-cell eNB 101, it may scan individual transmission beams 411, 412, . . . , 41M received from the UE 121, using only first to fourth reception beam. If information provided by the macro-cell eNB 101 does not contain priority for first to fourth beams, the small-cell eNB 111 may select first to fourth beams in random order. Since transmission beams are not reordered, the small cell eNB 111 may select transmission beams in random order. Therefore, the method of the second case may be configured in such a way as to perform only a few operations selected among the operations shown in FIG. 4B. Therefore, the small cell eNB 101 is capable of scanning individual transmission beams 411, 412, . . . , 41M received from the UE 121, using the method described above.

The third case is a case where, although the second case was performed, a preamble has not been received via an RACH. This case may correspond to a case where only a reception beam is recommended by a method described referring to FIG. 4C. Therefore, if the first operation of FIG. 4C where a recommendation beam is used is excluded, the small cell eNB 111 may scan individual transmission beams 411, 412, . . . , 41M, using only reception beams which have not been selected, as the method described referring to FIG. 4A. Therefore, the third operation is similar to the first operation, except for an operation where a recommended beam is used.

(2) It is assumed that transmission beams transmitted by UE 121 are only reordered. In this case, the small cell eNB 111 may perform operations corresponding to the following three cases.

First, transmission beams received via an RACH are sequentially scanned, using all reordered transmission beams.

Second, transmission beams received via an RACH are scanned, using only selected transmission beams.

Third, transmission beams received via an RACH are scanned, using only selected transmission beams; and transmission beams are scanned, using transmission beams not selected, if a preamble is not received via an RACH.

The first case is described, below, with reference to FIG. 4A. The small cell eNB 111 may reorder and scan transmission beams 411, 412, . . . , 41M of UE 121 in order of high possibility to be a best beam, based on information provided by the macro eNB 101. That is, the first transmission beam 411 of operation 401 may be not a randomly ordered beam, but a transmission beam which is estimated as a best beam based on information provided by the macro-cell eNB 101. The second transmission beam 412 may be a transmission beam which is estimated as a second best beam based on information provided by the macro-cell eNB 101.

If the small cell eNB 111 is capable of forming 27 reception beams and is recommended two beams by the macro-cell eNB 101, it may sequentially order the remaining beams except for the first and second beams. If information provided by the macro-cell eNB 101 does not contain priority for first and second beams, the small-cell eNB 111 may select first and second beams in random order. This means that reception beams are not reordered. Therefore, the small cell eNB 111 may select and scan all reception beams 311, 312, 313, . . . , 31N in random order as in operation 401. Therefore, the small cell eNB 101 is capable of scanning individual transmission beams 411, 412, . . . , 41M received from the UE 121, using the method described above.

The second case, where transmission beams received via an RACH are scanned, using only selected transmission beams, is described, below, with reference to FIG. 4A.

The small cell eNB 111 may perform the reordering operation and the scan operation for one transmission beam, based on information regarding best transmission beams provided by the macro eNB 101. In this case, the selected beams may be a transmission beam (transmission beams) recommended by the eNB 101. That is, the first transmission beam 411 of operation 401 may be not a randomly ordered beam, but a beam which is estimated as a best transmission beam based on information provided by the macro-cell eNB 101. The second transmission beam 412 may be a transmission beam which is estimated as a second best beam based on information provided by the macro-cell eNB 101.

If the UE 121 is capable of forming 9 transmission beams and is recommended two beams by the macro-cell eNB 101, it may scan a first transmission beam 411 and a second transmission beam 412, and perform the scan operation, using all reception beams 311, 312, 313, . . . , 31N, with respect to each of the transmission beams 411 and 412. If information provided by the macro-cell eNB 101 does not contain priority for the first and second transmission beams 411 and 412, the small-cell eNB 111 may select the first and second transmission beams 411 and 412 in random order. Since reception beams are not reordered, the small cell eNB 111 may select, when selecting a reception beam, transmission beams in random order. Therefore, the method of the second case may be configured in such a way as to perform only a few operations selected among the operations shown in FIG. 4A. Therefore, the small cell eNB 101 is capable of scanning transmission beams, which are estimated as a best beam, among transmission beams 411, 412, . . . , 41M transmitted by the UE 121, using the method described above.

The third case is a case where, although the second case was performed, a preamble has not been received via an RACH. In this case, the small cell eNB 111 may scan transmission beams which have not been selected. Therefore, the third operation is identical to the first operation, except for an operation where a recommended transmission beam is used.

(3) There may be a case where the small cell eNB 111 reorders reception beams and also transmission beams transmitted by the UE 121.

This case may correspond to operation 451 of the method described above referring to FIG. 4C. As in operation 415 of FIG. 4C, a best beam may be scanned using a transmission beam (transmission beams) and a reception beam (reception beams) which is (are) recommended (selected). For example, if the small cell eNB 111 reorders reception beams and the UE also reorders transmission beams, the small cell eNB preferentially scan a best reception beam and a best transmission beam. A beam according to the two conditions may be a real best beam or a beam according to other matching conditions may be a best beam. If the small cell eNB 111 receives a preamble signal from the UE 121 via an RACH, a combination of corresponding transmission beam and reception beam is valid, and this makes it possible to perform communication. Therefore, the small cell eNB 111 is capable of transmitting an RAR to the UE 121, without checking another combination.

When receiving a preamble signal transmitted via an RACH in operation 526, the small cell eNB 111 transmits the RACH response (RAR) signal to the UE 121 in operation 528. The UE 121 receives the RAR signal and transmits a Connection Request message for the data communication to the small cell eNB 111 in operation 530. The small cell eNB 111 creates a contention Resolution message and transmits the message to the UE 121 in operation 532. The small-cell eNB 111 creates a PDCP status report message and transmits the message to the UE 121 in operation 534.

Therefore, the UE 121 re-establishes the DRB2 with small cell eNB 111. The small cell eNB 111 and the UE 121 communicate with each other, via a PDSCH and a PUSCH, using the DRB2, in operation 538.

Although the embodiments have been described, assuming that one UE transmits a preamble to a small cell eNB via an RACH, it should be understood that the present invention may also be implemented in such a way that two or more UEs respectively transmit preambles to the small cell eNB via the same RACH. In this case, if a macro-cell eNB is capable of previously performing a scheduling operation, it may have performed a scheduling operation. However, if a macro-cell eNB is not capable of previously performing a scheduling operation, the small cell eNB may preferentially process one of the two or more UEs, which has a high possibility of success. Alternatively, the small cell eNB may preferentially select UE with a best RSSI among all the UEs which have transmitted preambles to the small-cell eNB, and transmit an RAR message to the UE. Alternatively, the small cell eNB may check QoE/QoS to be provided to all the UEs which have transmitted preambles, preferentially select UE required for a highest level of QoE/QoS, and transmit an RAR message to the UE. Alternatively, the small cell eNB may also apply weights to UEs based on the methods described above or other types of factors, preferentially select UE with a largest weight, and transmit an RAR message to the UE.

Figure 6:
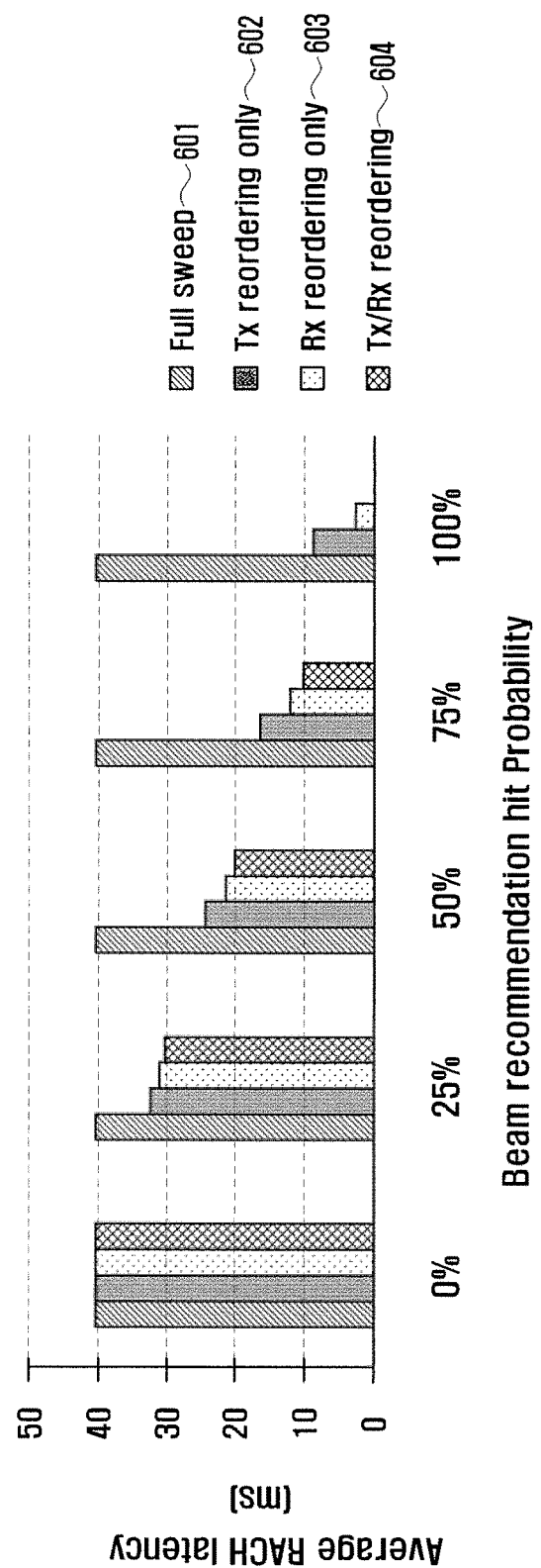
FIG. 6 shows scan time graphs comparing a process for scanning the entire beam to a process for reordering a transmission beam and a reception beam according to the present invention.

FIG. 6 shows scan time simulation graphs comparing a process for scanning the entire beam to a process for reordering a transmission beam and a reception beam according to the present invention.

The simulation of FIG. 6 is performed, assuming that UE has 9 transmission beams to an eNB and the eNB has 27 reception beams. It is also assumed that the average until preambles are received via an RACH in random order is NM/2 and this is applied to an LTE-A system. Therefore, it may take 40 ms to receive preambles via an RACH and to perform the full sweep.

FIG. 6 shows graphs corresponding to: a case 601 where the full seep is performed; a case 602 where UE reorders only transmission beams to an eNB; a case 603 where an eNB reorders only reception beams; and a case 604 where transmission beams and reception beams are reordered.

With reference to simulation graphs of FIG. 6, the horizontal axis represents beam recommendation hit probability by the reordering and the vertical axis represents time corresponding to the cases. Therefore, if the hit probability by reordering beams is 0%, each of the four cases described above needs 40 ms to perform corresponding operations. If the hit probability by reordering beams is increased to 25%, the cases 602, 603, and 604, using the beam reordering, decrease time required for performing corresponding operations by 10 ms, compared to time required for the full sweep. If the hit probability by reordering beams is increased to 50%, the cases 602, 603, and 604, using the beam reordering, decreases time required for performing corresponding operations by 20 ms, compared to time required for the full sweep. If the hit probability by reordering beams is 100%, or all the transmission/reception beams are reordered, no delay time exists.

With reference to simulation graphs of FIG. 6, the case where reception beams are reordered takes a shorter time than the case where transmission beams are reordered, except for the case where the hit probability by reordering beams is 0%.

Figure 7:
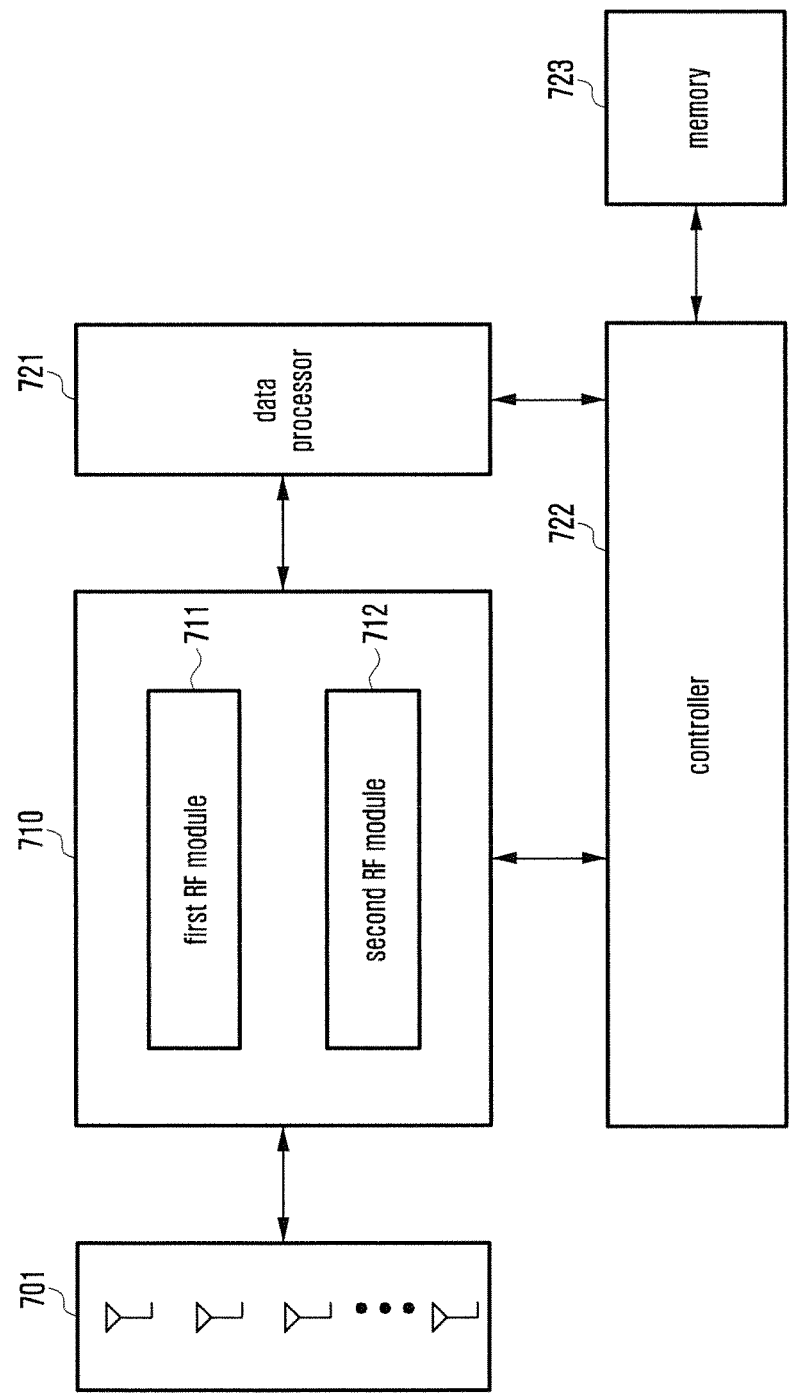
FIG. 7 is a diagram showing function blocks of UE according to the present invention.

FIG. 7 is a diagram showing function blocks of UE according to the present invention.

With reference to FIG. 7, UE includes an antenna unit 701 with a number of antennas for performing the beamforming. An RF unit 710 includes a first RF module 711 and a second RF module 712. The RF modules 711 and 712 differ from each other, and this is because the RF unit 710 needs to communicate with a macro-cell eNB or a small cell eNB via one RF module and to receive signals from the other eNB via the other RF module. The RF unit 710 down-converts the frequency of individual beams which are beam-formed and received via antennas and provides the converted result to a data processor 721. If the RF unit 710 needs to transmit data from the data processor 721 via a specified beam, it up-coverts the frequency of the data, multiplies the converted result with a beamforming factor, and outputs the results to individual antennas, thereby performing the transmission beamforming.

The data processor 721 is capable of performing the decoding, demodulation, etc. for signals output from the RF unit 710, and also measuring an RSSI and quality of received signals. The data processor 721 is also capable of encoding and modulating data to be transmitted and outputting the result. The data to be transmitted may be: data provided by the controller 721 or other accessories, e.g., a microphone (not shown), a camera (not shown), an external input device (not shown), etc.; or data provided by a controller 722.

The controller 722 controls all the operations of wireless UE to communicate with eNBs, e.g., a macro-cell eNB or a small cell eNB. In particular, the controller 722 is capable of controlling the UE to change the communication channel from a macro-cell eNB to a small cell eNB. For example, as described above, the controller 722 is capable of providing a macro-cell eNB with information regarding a best beam and a signal RSSI and of a small cell eNB. If the UE includes a GPS module (not shown) for tracking locations, the controller 722 is capable of providing obtained location information to a macro-cell. The controller 722 is also capable of receiving inputs from various types of accessories (not shown), e.g., a camera, various sensors, various user input devices, etc., and controlling corresponding functions.

A memory 723 stores various application programs, data for controlling operations of the wireless UE, etc. The memory 723 also stores control data used for communicating with a macro-cell eNB or a small cell eNB. If a specified transmission beam needs to be used according to beamforming schemes, the memory 723 may further store control data for transmitting a preamble via an RACH.

Although FIG. 7 does not show configurations other than the blocks described above, for the sake of convenience, it should be understood that the present invention may also include the configurations.

Figure 8:
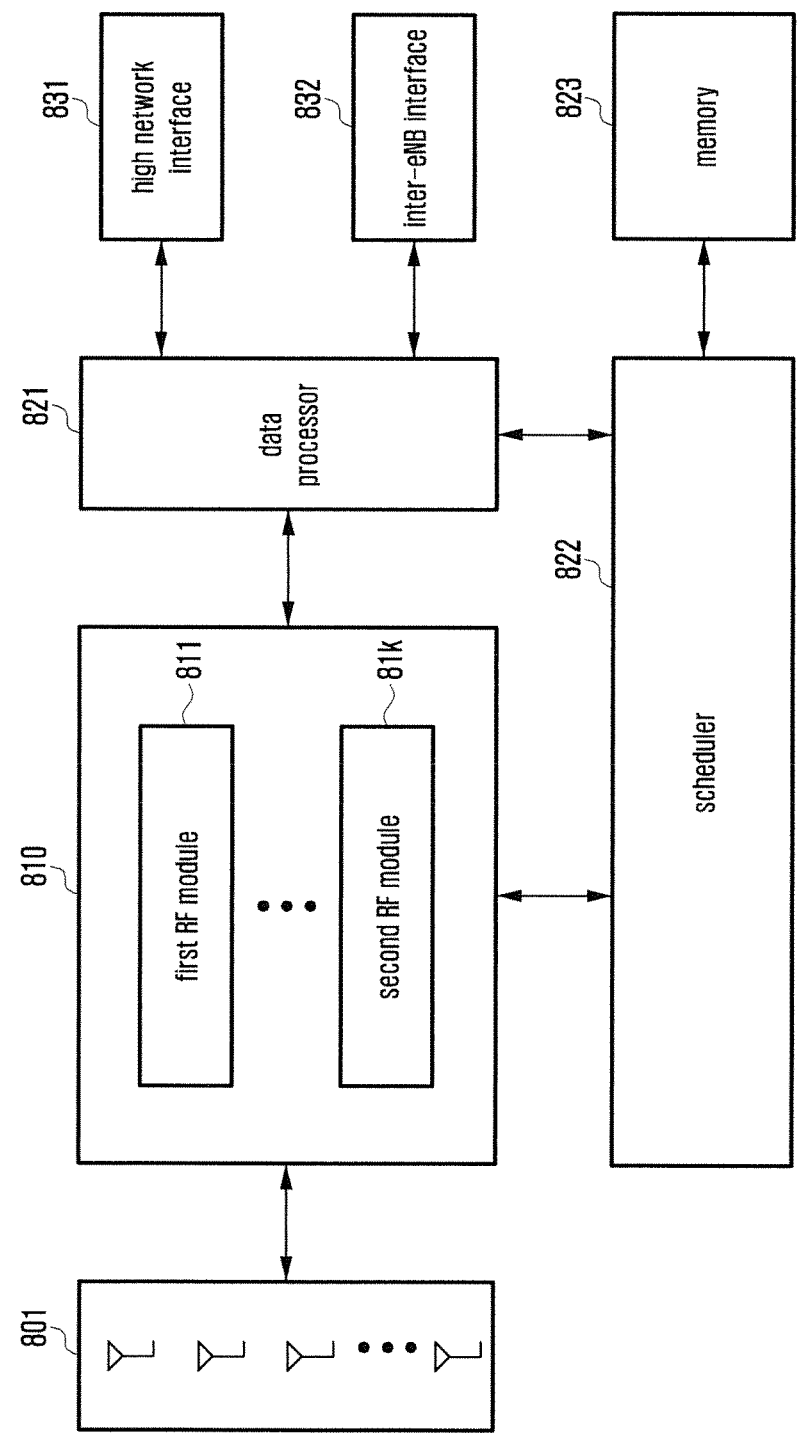
FIG. 8 is a diagram showing function blocks of an eNB according to the present invention.

FIG. 8 is a diagram showing function blocks of an eNB according to the present invention.

The embodiment of FIG. 8 has the same configurations as a macro-cell eNB or a small cell eNB. Therefore, the macro-cell eNB and the small cell eNB are described based on the internal blocks of FIG. 8.

With reference to FIG. 8, the eNB includes an antenna unit 801 with a number of antennas for performing the beamforming. An RF unit 810 includes a number of RF modules 811, . . . , 81k. An RF module included in the RF unit 810 may be a module for communicating with one UE or takes charge of part of the downlink (DL) or uplink (UL). The RF unit 810 down-converts the frequency of individual beams which are beam-formed and received via antennas and provides the converted result to a data processor 821. If the RF unit 810 needs to transmit data from the data processor 821 via a specified beam, it up-coverts the frequency of the data, multiplies the converted result with a beamforming factor, and outputs the results to individual antennas, thereby performing the transmission beamforming. Similarly, the RF unit 810 receives a signal from a corresponding antenna, and multiplies the received signal with a specific factor, thereby performing the reception beamforming.

The data processor 821 is capable of performing the decoding, demodulation, etc. for signals output from the RF unit 810, and also measuring an RSSI and quality of received signals. The data processor 821 is also capable of encoding and modulating data to be transmitted and outputting the result. The data to be transmitted may be data provided by a higher network interface 831 or an inter-eNB interface 832.

The scheduler 822 is capable of determining a bandwidth, data transmission/reception timing points, etc. between a specified UE and an eNB, and controlling corresponding operations. The scheduler 822 is also capable of controlling the RF unit 810 to perform the transmission beamforming and the reception beamforming to individual antennas. If a recommended transmission beam or recommended reception beam for a specified UE exists when performing the transmission beamforming and the reception beamforming, the scheduler 822 is capable of controlling the RF unit 810 to preferentially or selectively scan a corresponding beam. If the scheduler 822 is included in a small cell eNB, it is capable of controlling the scan operation and the reordering operation for a transmission beam and a reception beam between the UE and the small cell eNB, as described above. In contrast, if the scheduler 822 is included in a macro-cell eNB, it is capable of determining whether it hands over a communication channel for a specified UE to a small cell eNB, controlling the recommendation of a transmission beam and a reception beam when handing over a communication channel, etc. Since the control operations were described above, its description is omitted as follows.

If the scheduler 822 receives two or more preamble signals from specified UEs via an RACH, it identifies UEs transmitting preamble signals and transmitting an RAR signal to a corresponding UE. If the scheduler 822 needs to transmit an RAR signal to only one UE, it is capable of determining one UE, considering an RSSI, QoE/QoS, etc., to be provided to UE.

A memory 823 stores various application programs, data for controlling operations of the eNB, etc. The memory 823 also stores data regarding the transmission beam reordering and the reception beam reordering or control data for performing the reordering. The memory 823 may also store a history of the beam selection by UEs, various types of data, etc.

The higher network interface 831 allows the eNB to transmit/receive data and/or messages, etc. to/from a node of a higher network, e.g., an authentication server and/or a router, etc. Therefore, when the higher network interface 831 receives an initial access request from UE, it requests a specified higher node to authenticate the UE, and serves as an interface to forward data to the UE or data from the UE to another node.

The inter-eNB interface 832 serves as an interface to forward data or messages between macro-cell eNBs or between a macro-cell eNB and a small cell eNB. For example, as described above referring to FIG. 5, if the macro-cell eNB 101 needs to transmit a small cell addition request message to a small cell eNB 111, the inter-eNB interface 832 allows the macro-cell eNB 101 to transmit/receive data to/from the small cell eNB 111. When the small cell eNB 111 needs to transmit a cell addition request ACK message to the macro-cell eNB 101, the inter-eNB interface 832 allows the small-cell eNB 111 to transmit/receive data to/from the macro-cell eNB 101.

Figure 9:
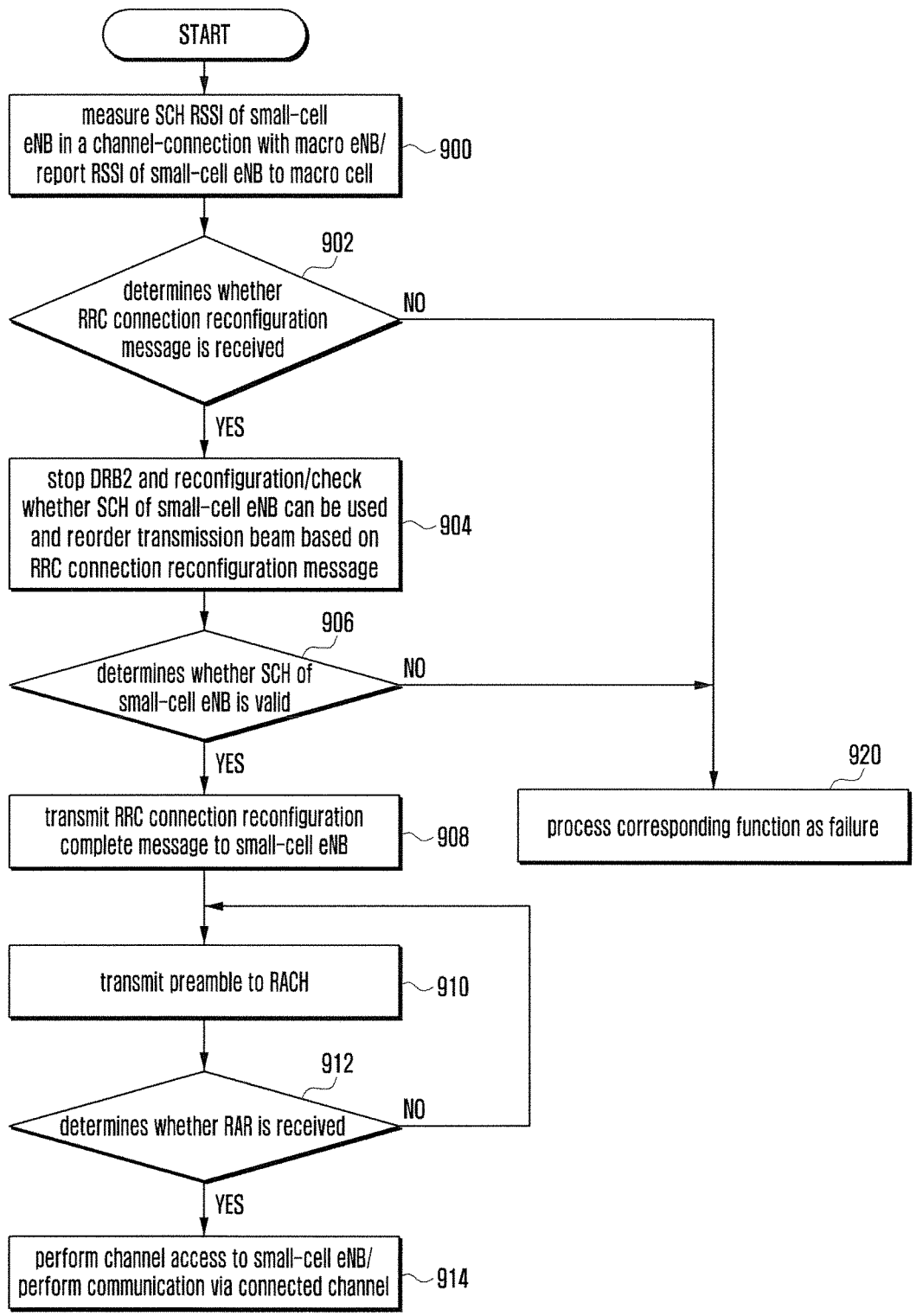
FIG. 9 is a control flowchart when UE, connected to a macro-cell eNB, channel-accesses a small-cell eNB, according to the present invention.

FIG. 9 is a control flowchart when UE, connected to a macro-cell eNB, channel-accesses a small-cell eNB, according to the present invention.

A UE controller 722 controls the antenna unit 701, the RF unit 710 and the data processor 721 to communicate with a macro-cell eNB in operation 900. In this case, one of the RF modules included in the RF unit 710 an RF module for communicating with the macro eNB 101. Therefore, the UE controller 722 is capable of controlling the other RF module to measure an RSSI received via SCH from the small cell eNB 111 in operation 900. The controller 722 controls the RF unit to transmit the measured RSSI of the small cell eNB to the macro-cell eNB 101. In this case, the RF module for communicating with a macro-cell eNB performs the transmission to the macro-cell eNB 101.

After that, the UE controller 722 determines whether an RRC Connection Reconfiguration message is received from the macro-cell eNB 101 with a preset period of time in operation 902. If the UE controller 722 ascertains that an RRC Connection Reconfiguration message has been received from the macro-cell eNB 101 with a preset period of time in operation 902, it proceeds with operation 904. On the other hand, if the UE controller 722 ascertains that an RRC Connection Reconfiguration message has not been received from the macro-cell eNB 101 with a preset period of time in operation 902, it processes the corresponding function as failure in operation 920.

The controller 722 controls the RF unit 710 and the data processor 721 to stop the transmission/reception of data to/from the DRB2 established with the macro-cell eNB 101 and resets the DRB2 with the small cell eNB 111 in operation 904. In this case, the controller 722 checks whether an SCH of the small cell eNB is in an available state. Alternatively, the controller 722 may reorder transmission beams, based on an RRC Connection Reconfiguration message in operation 904. The transmission beam reordering operation may be performed if a transmission beam reordering request is included in an RRC Connection Reconfiguration message. Therefore, if the RRC Connection Reconfiguration message does not include a transmission beam reordering request, the transmission beam reordering operation is not performed.

When channel access to the small cell eNB is performed, the RRC Connection Reconfiguration message may contain information regarding a recommendation beam to be estimated as a best transmission beam. Therefore, the controller 722 is capable of performing the transmission beams reordering operation, based on information regarding the recommended transmission beam. The transmission beam reordering operation may be performed at any timing point before a preamble is transmitted via an RACH. It should be understood that processes described as in operation 904 of FIG. 9 are examples to describe the present invention for the sake of convenience.

The controller 722 checks whether a SCH of the small cell eNB is in an available state in operation 906. For example, the controller 722 checks whether a SCH measured as in operation 900 is valid information. If the controller 722 ascertains that a SCH of the small cell eNB is valid in operation 906, it proceeds with operation 908. If the controller 722 ascertains that a SCH of the small cell eNB is not valid in operation 906, it processes a corresponding function as failure in operation 920.

The controller 722 transmits an RRC Connection Reconfiguration complete message to a small cell eNB 111 in operation 908, and a preamble via an RACH in operation 910. In this case, if transmission beams are reordered when a preamble is transmitted, the controller 722 performs the transmission in order of the reordered transmission beams. After that, the controller 722 checks whether an RAR message is received from the small cell eNB in operation 912. If the controller 722 ascertains that an RAR message has been received from the small cell eNB in operation 912, it proceeds with operation 914. If the controller 722 ascertains that an RAR message has not been received from the small cell eNB in operation 912, it continues performing operation 910. Since the preamble method was described above, a detailed description is omitted as follows. Since the method of reordering transmission beams and performing the transmission was described above, a detailed description is omitted as follows.

The UE controller 722 performs the channel access to the small cell eNB and performs the communication via the connected channel in operation 914. The channel access after the reception of an RAR may vary depending on procedures of individual wireless communication systems.

Figure 10:
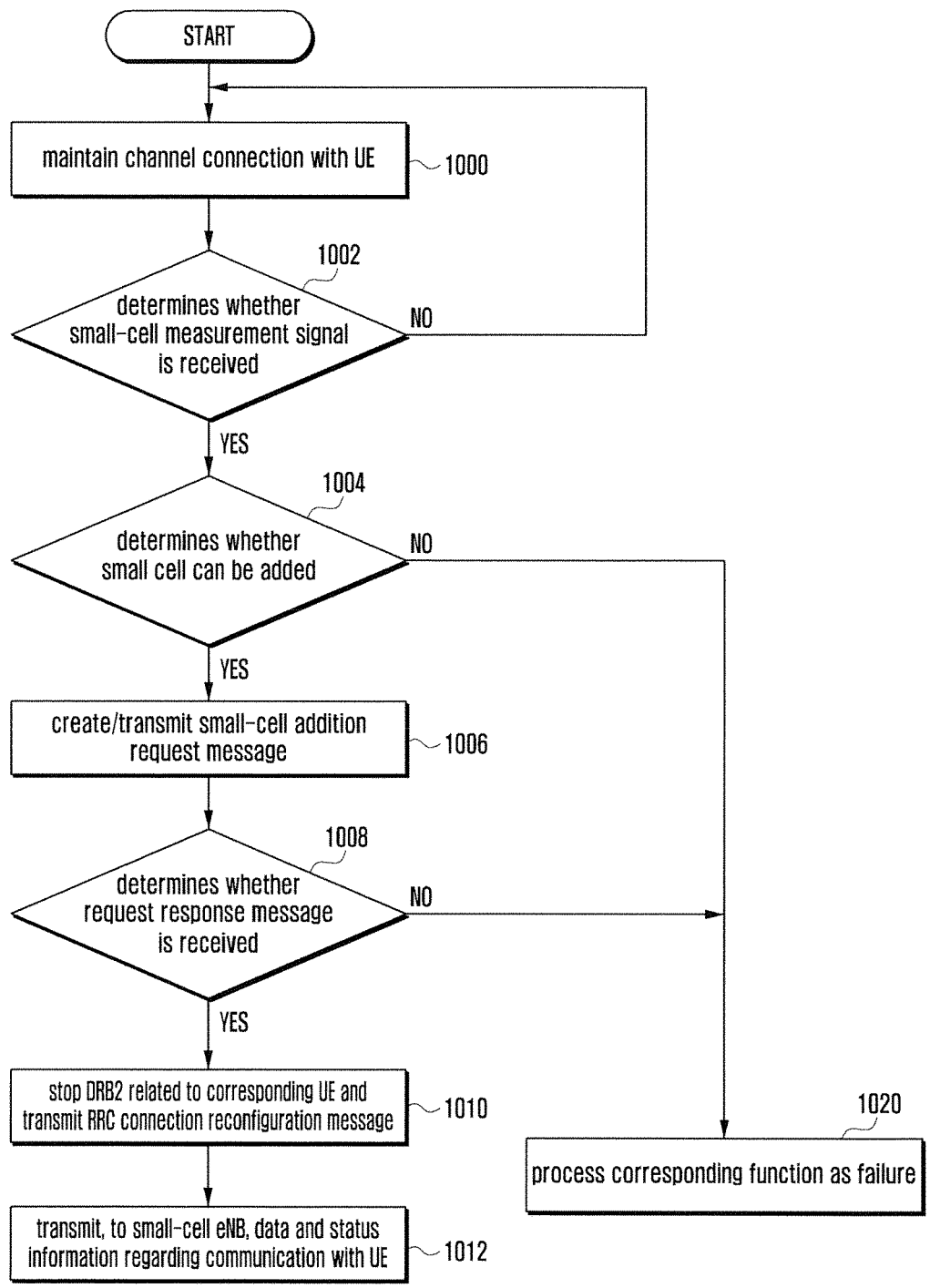
FIG. 10 is a control flowchart for a macro-cell eNB when UE, connected to the macro-cell eNB, channel-accesses a small-cell eNB, according to the present invention.

FIG. 10 is a control flowchart for a macro-cell eNB when UE, connected to the macro-cell eNB, channel-accesses a small-cell eNB, according to the present invention.

A macro-cell eNB and a small cell eNB shown in FIG. 10 have the same configurations as described above. Therefore, the internal blocks of the macro-cell eNB are described with reference to FIG. 8.

The scheduler 822 of the macro-cell eNB controls the RF unit 810 and the data processor 821 to channel-access UE in operation 1000. If a measurement result report of an RSSI of a small cell eNB is received from UE in operation 1002, the scheduler 822 checks whether the UE is connectable to the small cell eNB in operation 1004. If the UE is connectable to the small cell eNB in operation 1004, the scheduler 822 creates a small cell addition request message and transmits the message to the small cell eNB via the inter-eNB interface 832 in operation 1006. In this case, the scheduler 822 may also transmit, to the small cell eNB, recommendation information regarding a transmission beam and a reception beam of the UE and/or location information regarding the UE. In addition, the scheduler 822 may read out success history data regarding a transmission beam and a reception beam at a location identical or similar to that of the UE from the memory 823, processes the data in the form of table or message, and transmits the processed result to the small-cell eNB.

After that, the scheduler 822 of the macro-cell eNB checks whether a request response message is received from the small cell eNB in operation 1008. If a request response message is received from the small cell eNB in operation 1008, the scheduler 822 proceeds with operation 1010. If a request response message has not been received from the small cell eNB in operation 1008, the scheduler 822 processes a corresponding function as failure in operation 1020.

If a request response message is received from the small cell eNB in operation 1008, the scheduler 822 of the macro-cell eNB controls the RF unit 810 and the data processor 821 to stop the DRB2 established with corresponding UE and transmits an RRC Connection Reconfiguration message to the UE in operation 1010. The RRC Connection Reconfiguration message may contain recommendation information regarding a best transmission beam used when the UE attempts to channel access the small cell eNB via an RACH. Since the recommendation information was described above, a detailed description is omitted as follows.

The scheduler 822 of the macro-cell eNB provides the small cell eNB with communication status information regarding the UE, e.g., SN information, and transmits, to the UE, data to be transmitted to the UE in operation 1012. If data to be transmitted to the UE does not exist, the scheduler 822 may provide the small-cell eNB with only communication status information. Alternatively, the scheduler 822 may provide the small-cell eNB with no information. In this case, the scheduler 822 may inform the small-cell eNB 111 that there is no communication status history and no data.

Figure 11:
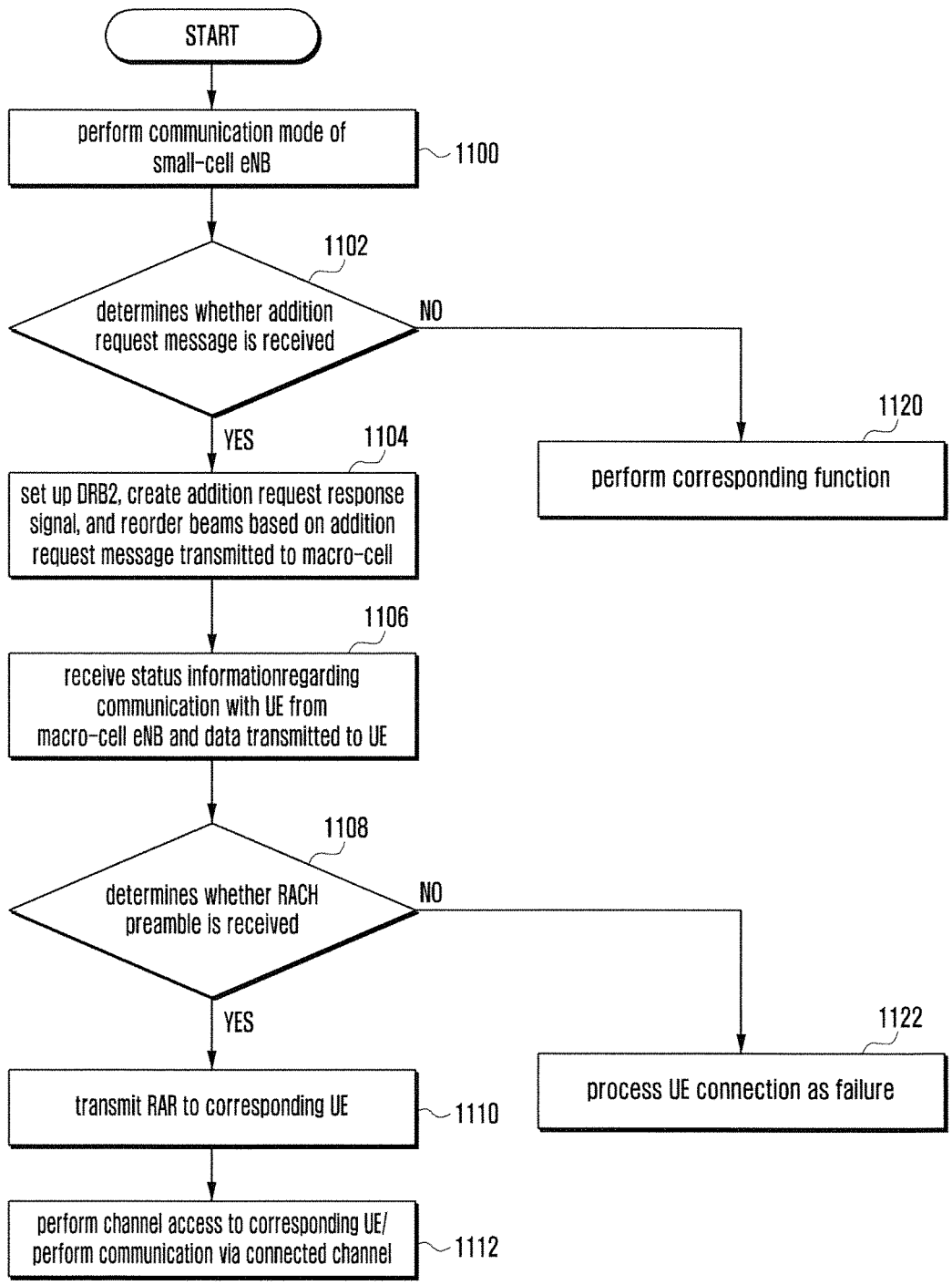
FIG. 11 is a control flowchart for a small cell eNB when UE, connected to a macro-cell eNB, channel-accesses the small-cell eNB, according to the present invention.

FIG. 11 is a control flowchart for a small cell eNB when UE, connected to a macro-cell eNB, channel-accesses the small-cell eNB, according to the present invention.

A small-cell eNB of FIG. 11 has the same configurations as a macro-cell eNB described above. Therefore, the internal blocks of the small-cell eNB are described based on the configurations described above with reference to FIG. 8.

The scheduler 822 of the small cell eNB executes a communication mode of small cell eNB in operation 1100. The communication mode of small cell eNB may be referred to as a state where the small cell eNB communicates with UE (UEs), through a channel established therebetween, via the RF unit 810 and the data processor 821.

The scheduler 822 of the small cell eNB checks whether an addition request message of a specified UE is received from the macro-cell eNB via the inter-eNB interface 832 in operation 1102. If an addition request message of a specified UE is received from the macro-cell eNB via the inter-eNB interface 832 in operation 1102, the scheduler 822 of the small cell eNB proceeds with operation 1104. If an addition request message of a specified UE has not been received from the macro-cell eNB via the inter-eNB interface 832 in operation 1102, the scheduler 822 of the small cell eNB performs a corresponding function in operation 1120.

The scheduler 822 of the small cell eNB checks whether corresponding UE is in a connectable state in operation 1104. If the macro-cell eNB has detected all the states of the small cell eNB and transmitted an addition request message, the scheduler 822 may not determine whether UE is in a connectable state. In the following description, it is assumed that the small cell eNB is connectable to corresponding UE.

Therefore, in order to communicate with corresponding UE, the scheduler 822 of the small cell eNB controls the RF unit 810 and the data processor 821 to establish a DRB2 with the UE, and transmits an addition request ACK message to the macro-cell eNB via the inter-eNB interface 832 in operation 1104.

The scheduler 822 of the small cell eNB is capable of reordering transmission beams and/or reception beams, based on the addition request message received in in operation 1104. Since the process of reordering transmission beams and/or reception beams was explained above with reference to FIGS. 4A and 4B and FIG. 5, a detailed description is omitted as follows. The process of reordering transmission beams and/or reception beams by the scheduler 822 of the small cell eNB may be performed in operation 1104 or later; however, it needs to be performed before operation 1108.

The scheduler 822 of the small cell eNB is capable of receiving data to be transmitted to UE and communication status information regarding UE from the macro-cell eNB via the inter-eNB interface 832 in operation 1106. This corresponds to a process of receiving: communication status information regarding the UE, i.e., SN information; and data which has not been transmitted to the UE, if the macro-cell eNB is in the process of communication with corresponding UE.

After receiving, from the macro-cell eNB, data to be transmitted to corresponding UE, the scheduler 822 of the small cell eNB is capable of checking whether a preamble is received from the UE via an RACH in operation 1108. If the preamble signal has a value greater than or equal to a preset threshold, the scheduler 822 ascertains that a preamble has been received from the UE. If a preamble signal has been received, the scheduler 822 is capable of sweeping an RACH according to the reordered transmission beams and reception beams as described above.

If corresponding UE, in the process of communication, is not connected to an RACH within a preset period of time, the scheduler 822 of the small cell eNB processes access to UE as failure in operation 1122. On the other hand, if a preamble has been received from corresponding UE via an RACH, the scheduler 822 of the small cell eNB controls the RF unit 810 and the data processor 821 to transmits an RAR message to the UE in operation 1110. After that, the scheduler 822 of the small cell eNB performs channel access to the UE and communicates with the UE via the connected channel in operation 1112.

The embodiments of the present invention described in the description and drawings are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

INDUSTRIAL APPLICABILITY

The present invention can be used in wireless communication systems.

The invention claimed is:

1. A channel access method for a small cell eNodeB (eNB) to set up a channel with a user equipment (UE) which is in a process of communication with a macro-cell eNB in a wireless network capable of using a number of transmission/reception beams, the method comprising:
   receiving a request message for requesting setup of a channel with the UE from the macro-cell eNB, setting up a data radio bearer (DRB2) to communicate with the UE, and transmitting a response (acknowledgement) message to the macro-cell eNB;
   receiving, from the macro-cell eNB, information related to data to be transmitted to the UE;
   reordering an order of beams to receive a preamble via a RACH from the UE, based on information included in the request message, and scanning the RACH; and
   receiving a preamble signal of the UE via the RACH, creating a RACH response signal, transmitting the RACH response signal to the UE, and performing a procedure for setting up a channel.

2. The method of claim 1, wherein receiving a preamble signal of the UE comprises:
   receiving a preamble signal which is greater than or equal to a preset threshold.

3. The method of claim 1, wherein the information included in the request message comprises:
   recommendation information regarding a transmission beam of the UE or a reception beam of the small cell eNB or location information regarding the UE.

4. The method of claim 3, wherein reordering the order of beams comprises:
   preferentially reordering and scanning a reception beam with a relatively high probability of success, based on the location information regarding the UE; or
   preferentially reordering and scanning a recommended beam, based on the recommendation information.

5. A channel access method for a user equipment (UE), connected to a first eNodeB (eNB), to access a second eNB, in a wireless communication system, the method comprising:
   measuring a signal strength of beams in each direction formed from the second eNB using a second radio unit while being connected to the first eNB through a first radio unit;
   transmitting a measurement report message to the first eNB using the first radio unit, the measurement report message including at least one signal strength of the measured signal strength of beams;
   receiving, from the first eNB using the first radio unit, a radio resource control (RRC) connection reconfiguration message for assessing the second eNB;
   stopping a data radio bearer (DRB2) with the first eNB through the first radio unit;
   identifying whether the measured signal strength of beams is valid based on the received RRC connection reconfiguration message;
   transmitting an RRC connection reconfiguration complete message to the second eNB through the second radio unit using a best one of a number of transmission beams through the second radio unit;
   transmitting a preamble through a RACH of the second eNB, using the best one of the number of transmission beams through the second radio unit, based on the received RRC connection reconfiguration message; and
   communicating with the second eNB using the best one of the number of transmission beams through the second radio unit, if a RACH response (RAR) is received from the second eNB.

6. The method of claim 5, wherein:
   the RRC connection reconfiguration message comprises at least one or more recommendation transmission beams to transmit a preamble to the second eNB via the RACH; and
   the method further comprises reordering a use order of transmission beams to perform the transmission by preferentially using the recommendation transmission beam.

7. A channel access apparatus of a small cell eNodeB (eNB) in a wireless communication system for supporting a user equipment (UE), in a process of communication with a macro-cell eNB, to perform channel-access to the small cell eNB, in a wireless network capable of using a number of transmission/reception beams, the apparatus comprising:
   an antenna unit including a number of antennas for creating a number of transmission/reception beams;
   a radio frequency (RF) unit including a number of RF modules for communicating with UEs under the small cell eNB via the antenna unit;
   a data processor configured to modulate and decode data to be transmitted to the RF unit and to demodulate and decode data received from the RF unit;
   an inter-eNB interface configured to communicate with another eNB, including the macro-cell eNB; and a scheduler configured to:
  receive a request message requesting setup of a channel with the UE from the macro-cell eNB via the inter-eNB interface, set up a data radio bearer (DRB2) to communicate with the UE, and transmit a response (acknowledgement) message to the macro-cell eNB;
  receive, from the macro-cell eNB, information related to data to be transmitted to the UE;
  reorder an order of reception beams to receive a preamble from the UE via an RACH, based on information included in the request message;
  control the RF unit to scan the RACH according to the reordered order of reception beams;
  control, when receiving a preamble signal of the UE via the RACH, the data processor and the RF unit to transmit a RACH response signal to the UE; and
  perform a procedure for setting up a channel with the UE.

8. The apparatus of claim 7, wherein the information included in the request message comprises:
  recommendation information regarding a transmission beam of the UE or a reception beam of the small cell eNB or location information regarding the UE.

9. A channel access apparatus for a user equipment (UE), in a process of communication with a macro-cell eNB, to perform channel access to a small cell eNodeB (eNB) in a wireless network capable of using a number of transmission/reception beams, the apparatus comprising:
  an antenna unit including a number of antennas for creating a number of transmission/reception beams;
  a radio frequency (RF) unit including a first RF module for communicating with the macro-cell eNB via the antenna unit, and a second RF module for communicating with the small cell eNB via the antenna unit in beamforming scheme;
  a data processor configured to modulate and decode data to be transmitted to the RF unit and to demodulate and decode data received from the RF unit; and
  a controller configured to:
    control the RF unit and the data processor to measure a signal strength of beams in each direction formed from the small cell eNB in a state where the UE is connected to the macro-cell eNB;
    transmit a measurement report message to the macro-cell eNB using the first RF module, the measurement report message including at least one signal strength of the measured signal strength of beams;
    receive, from the macro-cell eNB using the first RF module, a radio resource control (RRC) connection reconfiguration message for assessing the small cell eNB,
    stop a data radio bearer (DRB2) with the macro-cell eNB through the first RF module;
    identify whether the measured signal strength of the beams is valid based on the received RRC connection reconfiguration message;
    transmit an RRC connection reconfiguration complete message to the small cell eNB through the second RF module using a best one of a number of transmission beams through the second RF module;
    transmit a preamble through a RACH of the small cell eNB, using the best one of the number of transmission beams through the second RF module, based on the received RRC connection reconfiguration message; and
    communicate with the second eNB using the best one of the number of transmission beams through the second RF module, if a RACH response (RAR) is received from the second eNB.

10. The apparatus of claim 9, wherein:
the RRC connection reconfiguration message comprises at least one or more recommendation transmission beams to transmit a preamble to the small cell eNB via the RACH; and
the controller reorders a use order of transmission beams to perform the transmission by preferentially using the recommendation transmission beam.

* * * * *